US012701559B2

(12) United States Patent
Hang et al.

(10) Patent No.: US 12,701,559 B2
(45) Date of Patent: Aug. 4, 2026

(54) RESOURCE SCHEDULING METHOD AND COMMUNICATION APPARATUS

(71) Applicant: HUAWEI TECHNOLOGIES CO., LTD., Shenzhen (CN)

(72) Inventors: Haicun Hang, Shanghai (CN); Xiaohan Wang, Shanghai (CN); Liuliu Ji, Shanghai (CN); Huangping Jin, Shanghai (CN); Xiang Ren, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 18/509,898

(22) Filed: Nov. 15, 2023

(65) Prior Publication Data

US 2024/0107509 A1      Mar. 28, 2024

Related U.S. Application Data

(63) Continuation of application No. PCT/CN2022/091280, filed on May 6, 2022.

(30) Foreign Application Priority Data

May 20, 2021      (CN) .......................... 202110554864.8

(51) Int. Cl.
| | |
|---|---|
| *H04W 72/0453* | (2023.01) |
| *H04L 1/1607* | (2023.01) |
| *H04L 5/00* | (2006.01) |
| *H04W 72/12* | (2023.01) |

(52) U.S. Cl.
CPC ....... *H04W 72/0453* (2013.01); *H04L 1/1614* (2013.01); *H04L 5/0051* (2013.01); *H04W 72/12* (2013.01)

(58) Field of Classification Search
CPC . H04W 72/0453; H04W 72/12; H04W 72/23; H04L 1/1614; H04L 5/0051; H04L 5/0094; H04L 5/0023
See application file for complete search history.

(56) References Cited

U.S. PATENT DOCUMENTS

| | | | |
|---|---|---|---|
| 2018/0367274 A1* | 12/2018 | Shi ........................ | H04L 5/0048 |
| 2020/0022122 A1 | 1/2020 | Wu et al. | |
| 2020/0296758 A1 | 9/2020 | Li et al. | |

(Continued)

*Primary Examiner* — Yu-Wen Chang
(74) *Attorney, Agent, or Firm* — Maier & Maier, PLLC

(57) ABSTRACT

A resource scheduling method and a communication apparatus. In the method, a terminal device receives first indication information for determining a quantity of layers to be scheduled corresponding to each frequency domain unit in a plurality of frequency domain units, or for determining a quantity of layers to be scheduled corresponding to each frequency domain unit group in one or more frequency domain unit groups, where one frequency domain unit group includes one or more frequency domain units, one frequency domain unit includes one or more frequency domain resources with a same quantity of layers to be scheduled; and determines, based on the first indication information, a quantity of layers to be scheduled that are on frequency domain resources for data transmission, where at least two of the frequency domain resources for data transmission have different quantities of layers to be scheduled.

20 Claims, 15 Drawing Sheets

(56) References Cited

U.S. PATENT DOCUMENTS

| | | | | |
|---|---|---|---|---|
| 2021/0281448 A1* | 9/2021 | Li | .......................... | H04W 72/21 |
| 2021/0351884 A1* | 11/2021 | Huang | .................. | H04L 5/0053 |
| 2022/0345266 A1* | 10/2022 | Zheng | .................... | H04L 5/001 |
| 2023/0057080 A1* | 2/2023 | Khoshnevisan | ...... | H04L 5/0051 |
| 2023/0327819 A1* | 10/2023 | Fang | .................... | H04B 7/0404 |
| | | | | 370/329 |
| 2024/0429991 A1* | 12/2024 | Yuan | .................... | H04L 5/0023 |

* cited by examiner

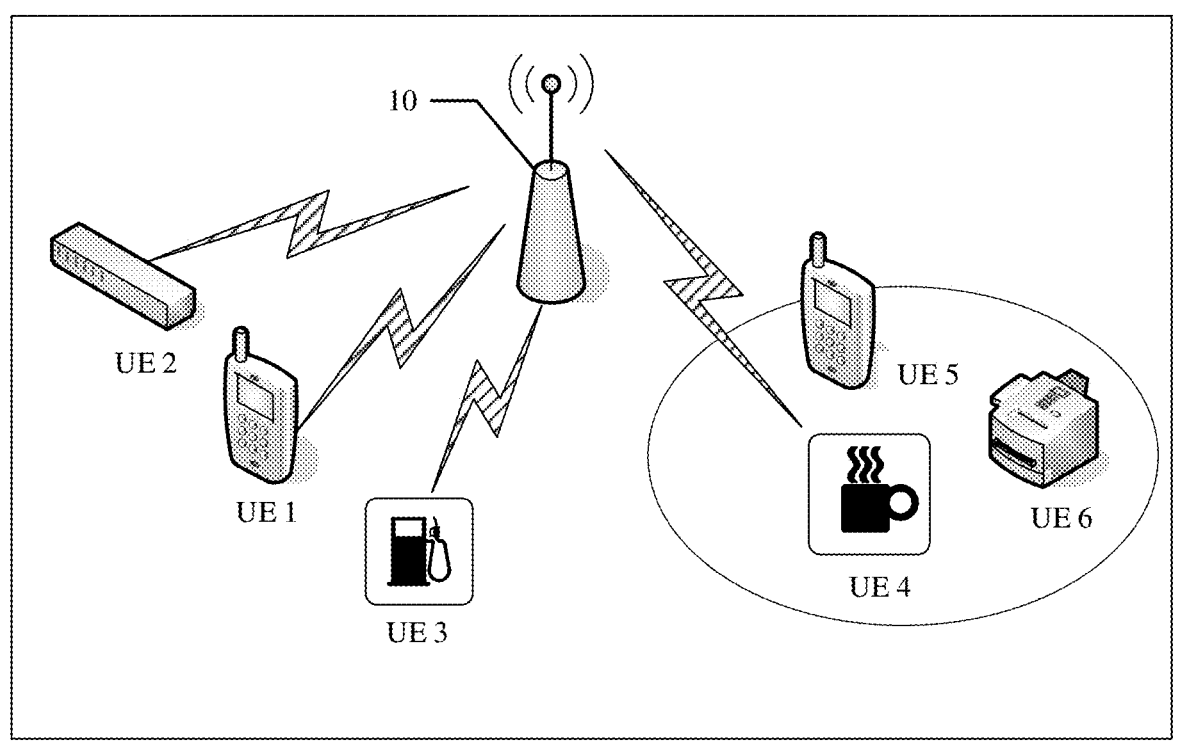
FIG. 1
| RBG index | 0 | 1 | 2 | 3 | 4 | 5 | 6 | 7 | 8 | 9 |
|-----------|---|---|---|---|---|---|---|---|---|---|
| Bitmap | 1 | 0 | 0 | 1 | 1 | 0 | 0 | 1 | 1 | 0 |
FIG. 2a
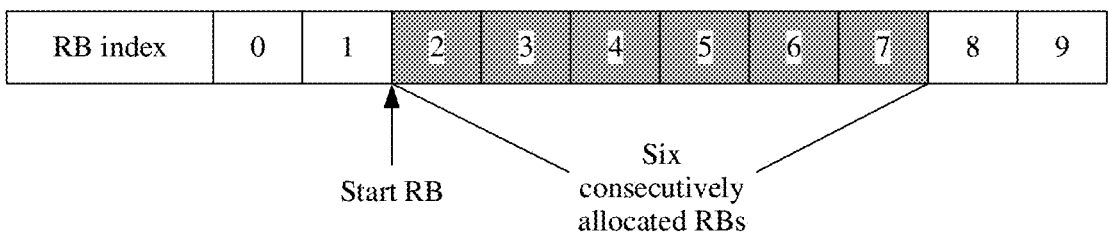
FIG. 2b

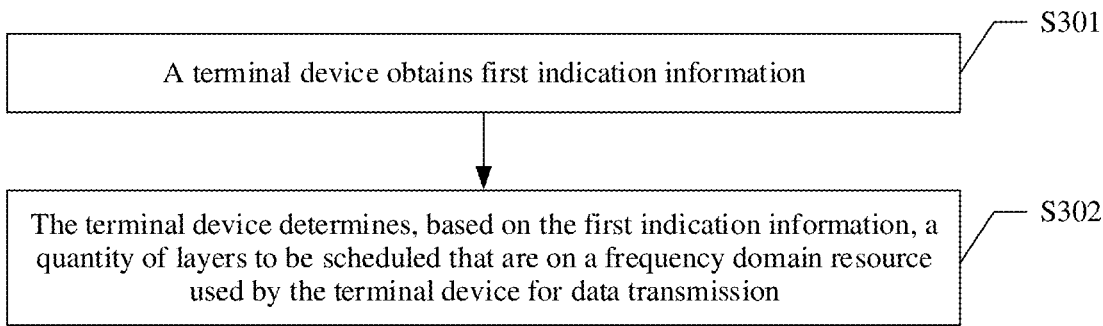

┌─────────────────────────────────────────────────────────────────┐  ⌐ S301
│        A terminal device obtains first indication information     │
└─────────────────────────────────────────────────────────────────┘

┌─────────────────────────────────────────────────────────────────┐  ⌐ S302
│  The terminal device determines, based on the first indication information, a │
│  quantity of layers to be scheduled that are on a frequency domain resource   │
│          used by the terminal device for data transmission        │
└─────────────────────────────────────────────────────────────────┘

FIG. 3a

┌──────────────────┐                          ┌──────────────────┐
│  Terminal device │                          │  Network device  │
└──────────────────┘                          └──────────────────┘

S301: First indication information

┌───────────────────────────────┐
│  S302: Determine, based on the first │
│  indication information, a quantity of │
│  layers to be scheduled that are on a  │
│  frequency domain resource used by the │
│  terminal device for data transmission │
└───────────────────────────────┘

FIG. 3b

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Frequency domain unit 0 | | | Frequency domain unit 1 | | | Frequency domain unit 2 | | | Frequency domain unit 3 | | | Frequency domain unit 4 | | | Frequency domain unit 5 | | | Frequency domain unit 6 | |

Frequency domain resource

FIG. 4

| Index of frequency domain resource | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Frequency domain unit group 1 | Frequency domain unit 10 | | | Frequency domain unit 11 | | | Frequency domain unit 12 | | | | Frequency domain unit 13 | | | Frequency domain unit 14 | | | Frequency domain unit 15 | | | Frequency domain unit 16 | |
| Frequency domain unit group 2 | Frequency domain unit 20 | | | | | | Frequency domain unit 21 | | | | | | Frequency domain unit 22 | | | | | | Frequency domain unit 23 | |

FIG. 5

| Index value of a frequency domain resource | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Quantity of layers to be scheduled | 1 | | | 2 | | | 4 | | | 3 | | | 1 | | | 2 | | |

Frequency domain unit 0    Frequency domain unit 1    Frequency domain unit 2    Frequency domain unit 3    Frequency domain unit 4    Frequency domain unit 5

FIG. 6b

| Index of a frequency domain resource | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| L1 bitmap | 0 | | 1 | | 1 | | 1 | | 1 | | 0 | | 0 | | 0 | |
| L2 bitmap | 0 | | | 0 | | | 1 | | | 1 | |

FIG. 6c

| Index value of a frequency domain resource | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| RA bitmap | 1 | 0 | 0 | 1 | 1 | 1 | 0 | 0 | 0 | 1 | 1 | 1 | 1 | 1 | 1 | 0 | 0 | 0 |
| L1 bitmap | 0 | 0 | 0 | 1 | 1 | 1 | 1 | 1 | 1 | 1 | 1 | 1 | 0 | 0 | 0 | 0 | 0 | 0 |
| L2 bitmap | 0 | 0 | 0 | 1 | 1 | 1 | 1 | 1 | 1 | 1 | 1 | 1 | 1 | 1 | 1 | 1 | 1 | 1 |

FIG. 7d

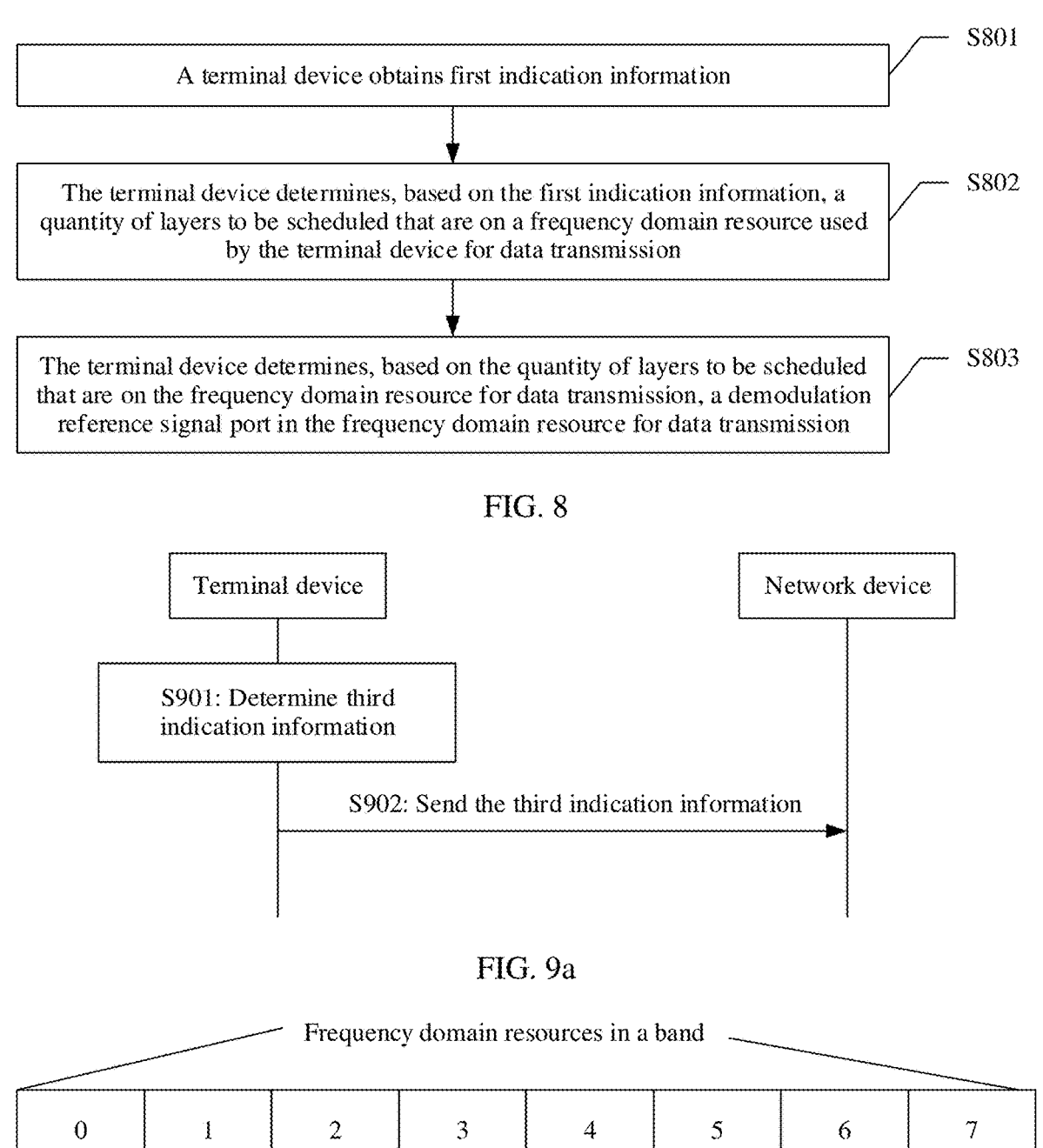

A terminal device obtains first indication information ⟋ S801

The terminal device determines, based on the first indication information, a quantity of layers to be scheduled that are on a frequency domain resource used by the terminal device for data transmission ⟋ S802

The terminal device determines, based on the quantity of layers to be scheduled that are on the frequency domain resource for data transmission, a demodulation reference signal port in the frequency domain resource for data transmission ⟋ S803

FIG. 8

Terminal device                              Network device

S901: Determine third indication information

S902: Send the third indication information

FIG. 9a

Frequency domain resources in a band

| 0 | 1 | 2 | 3 | 4 | 5 | 6 | 7 |
|---|---|---|---|---|---|---|---|
| Frequency domain unit 0 | | Frequency domain unit 1 | | | | Frequency domain unit 2 | |

FIG. 9b

| Index value of frequency domain resource | 0 | 1 | 2 | 3 | 4 | 5 | 6 | 7 |
|---|---|---|---|---|---|---|---|---|
| Frequency domain unit group 1 | Frequency domain unit 10 | | Frequency domain unit 11 | | | | Frequency domain unit 12 | |
| Frequency domain unit group 2 | Frequency domain unit 20 | | | | | | Frequency domain unit 21 | |
FIG. 9c
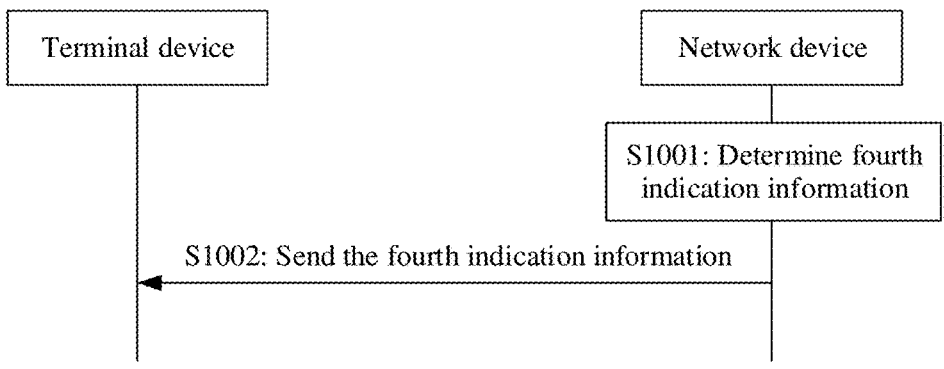
FIG. 10
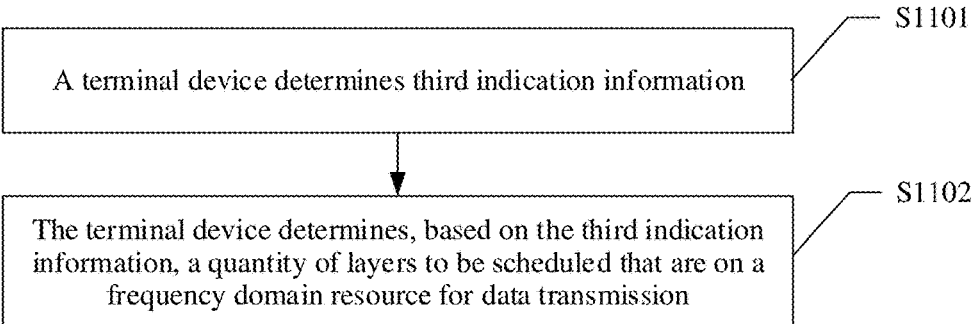
FIG. 11

RESOURCE SCHEDULING METHOD AND COMMUNICATION APPARATUS

CROSS-REFERENCE TO RELATED APPLICATIONS

This application is a continuation of International Application No. PCT/CN2022/091280, filed on May 6, 2022, which claims priority to Chinese Patent Application No. 202110554864.8, filed on May 20, 2021. The disclosures of the aforementioned applications are hereby incorporated by reference in their entireties.

TECHNICAL FIELD

Embodiments relate to the field of communication technologies and to a resource scheduling method and a communication apparatus.

BACKGROUND

There is an association relationship between a frequency selection characteristic of a channel and a bandwidth of the channel. For example, in a long term evolution (LTE) system or a 5th generation mobile communication technology-based (5G) system, a larger bandwidth indicates a more conspicuous frequency selection characteristic of a channel. A throughput of the communication system may become higher by increasing a quantity of terminal devices (or referred to as a quantity of users) to be scheduled in the communication system. However, as the quantity of users increases, inter-channel interference also becomes larger, and a user that schedules a specific channel changes frequently. In other words, it may be understood as that a frequency selection characteristic of the channel is intensified. When the frequency selection characteristic of the channel is conspicuous (or has a large value), if resource scheduling is not flexible enough, overall performance of the communication system is limited.

It can be understood that how to improve flexibility of resource scheduling in a communication system is an urgent problem to be resolved.

SUMMARY

Embodiments provide a resource scheduling method and a communication apparatus. According to the resource scheduling method and the communication apparatus, when invoking a frequency domain resource for data transmission, a terminal device may perform differentiated configuration on a quantity of layers to be scheduled that are on each frequency domain resource, to improve flexibility of resource scheduling in a communication system.

According to a first aspect, embodiments provide a resource scheduling method. The method may be applied to a terminal device, or may be applied to a component (a chip, a processor, or the like) of the terminal device. For example, the method is applied to the terminal device. The method includes: The terminal device receives first indication information, where the first indication information is used to determine a quantity of layers to be scheduled corresponding to each frequency domain unit in a plurality of frequency domain units, or is used to determine a quantity of layers to be scheduled corresponding to each frequency domain unit group in one or more frequency domain unit groups, where one frequency domain unit group includes one or more frequency domain units, one frequency domain unit includes one or more frequency domain resources, and the one or more frequency domain resources in the frequency domain unit have a same quantity of layers to be scheduled; and the terminal device determines, based on the first indication information, a quantity of layers to be scheduled that are on frequency domain resources used by the terminal device for data transmission, where at least two of the frequency domain resources for data transmission have different quantities of layers to be scheduled.

According to the method described in the first aspect, when a frequency domain resource is invoked for data transmission, a quantity of layers to be scheduled that are on each frequency domain resource may be configured differently, to improve flexibility of resource scheduling in a communication system.

In a possible implementation, the first indication information includes a first bitmap, one bit in the first bitmap corresponds to one frequency domain unit, and the bit is used to determine a quantity of layers to be scheduled that are in the frequency domain unit corresponding to the bit.

In a possible implementation, for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit includes the frequency domain resource.

In a possible implementation, the first indication information includes a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

In a possible implementation, for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. The first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

In a possible implementation, the terminal device determines, based on the quantity of layers to be scheduled that are on the frequency domain resources for data transmission, a demodulation reference signal port in the frequency domain resources for data transmission, where demodulation reference signal ports in at least two of the frequency domain resources for data transmission are different.

In a possible implementation, the demodulation reference signal port is a DMRS port.

In a possible implementation, for one frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

In a possible implementation, the terminal device receives second indication information, where the second indication information includes an index value that is in a demodulation reference signal port table and that corresponds to the frequency domain resources for data transmission; each index value in the demodulation reference signal port table corresponds to a plurality of quantities of demodulation reference signal ports; and for one frequency domain resource for data transmission, a demodulation reference signal port in the frequency domain resource is a first demodulation reference signal port, where a quantity of first demodulation reference signal ports corresponds to the index value, and the quantity of first demodulation reference signal ports is the same as a quantity of layers to be scheduled that are on the frequency domain resource.

In a possible implementation, the terminal device determines third indication information, where the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups; and the terminal device sends the third indication information to a network device.

In a possible implementation, the third indication information further includes the quantity of layers to be scheduled corresponding to each frequency domain unit in the plurality of frequency domain units, or the quantity of layers to be scheduled corresponding to each frequency domain unit group in the one or more frequency domain unit groups; and the third indication information is used by the network device to determine the first indication information.

In a possible implementation, the terminal device determines the correspondence between the frequency domain resource in the reporting band and each frequency domain unit in the plurality of frequency domain units, or the correspondence between the frequency domain resource in the reporting band and each frequency domain unit in the one or more frequency domain unit groups.

In a possible implementation, the terminal device determines, based on a quantity of frequency domain resources corresponding to each frequency domain unit, the correspondence between the frequency domain resource in the reporting band and each frequency domain unit in the plurality of frequency domain units, where the quantity of frequency domain resources corresponding to the frequency domain unit is pre-specified in a protocol; or the terminal device determines, based on a quantity of frequency domain resources corresponding to each frequency domain unit in each frequency domain unit group, the correspondence between each frequency domain unit in each frequency domain unit group in the one or more frequency domain unit groups and the frequency domain resource in the reporting band, where the quantity of frequency domain resources corresponding to each frequency domain unit in the frequency domain unit group is pre-specified in a protocol.

In a possible implementation, the terminal device receives fourth indication information from a network device, where the fourth indication information indicates a correspondence between a frequency domain resource in an active band and each frequency domain unit in the plurality of frequency domain units, or the fourth indication information indicates a correspondence between a frequency domain resource in an active band and each frequency domain unit in the one or more frequency domain unit groups; and the terminal device determines, based on the fourth indication information, the correspondence between the frequency domain resource in the active band and each frequency domain unit in the plurality of frequency domain units, or the correspondence between the frequency domain resource in the active band and each frequency domain unit in the one or more frequency domain unit groups.

According to a second aspect, embodiments provide a resource scheduling method. The method may be applied to a network device, or may be applied to a component (a chip, a processor, or the like) of a network device. For example, the method is applied to the network device. The method includes: The network device sends first indication information to a terminal device, where the first indication information is used to determine a quantity of layers to be scheduled corresponding to each frequency domain unit in a plurality of frequency domain units, or is used to determine a quantity of layers to be scheduled corresponding to each frequency domain unit group in one or more frequency domain unit groups, where one frequency domain unit group includes one or more frequency domain units, one frequency domain unit includes one or more frequency domain resources, and the one or more frequency domain resources in the frequency domain unit have a same quantity of layers to be scheduled.

According to the method in the second aspect, when allocating a frequency domain resource to the terminal device for data transmission, the network device determines a correspondence between a frequency domain resource and a frequency domain unit based on a frequency domain correlation of a channel, to perform differentiated configuration on a quantity of layers to be scheduled that are on each frequency domain resource, thereby improving flexibility of resource scheduling in a communication system. In addition, as the correspondence between the frequency domain resource and the frequency domain unit is determined based on the frequency domain correlation of the channel, it may be understood as that the correspondence between the frequency domain resource and the frequency domain unit adapts a frequency selection characteristic of the channel. In addition, a quantity of layers to be scheduled that are on each frequency domain resource may be flexibly configured based on an actual application scenario, to avoid a waste of frequency domain resources, thereby improving spectrum utilization.

In a possible implementation, the first indication information includes a first bitmap, one bit in the first bitmap corresponds to one frequency domain unit, and the bit is used to determine a quantity of layers to be scheduled that are in the frequency domain unit corresponding to the bit.

In a possible implementation, for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit includes the frequency domain resource.

In a possible implementation, the first indication information includes a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

In a possible implementation, for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. The first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

In a possible implementation, the network device sends second indication information, where the second indication information includes an index value that is in a demodulation reference signal port table and that corresponds to the frequency domain resources for data transmission; each index value in the demodulation reference signal port table corresponds to a plurality of quantities of demodulation reference signal ports; and for one frequency domain resource for data transmission, a demodulation reference signal port in the frequency domain resource is a first demodulation reference signal port, where a quantity of first demodulation reference signal ports corresponds to the index value, and the quantity of first demodulation reference signal ports is the same as a quantity of layers to be scheduled that are on the frequency domain resource.

In a possible implementation, the network device receives third indication information from the terminal device, where the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups.

In a possible implementation, the third indication information further includes the quantity of layers to be scheduled corresponding to each frequency domain unit in the plurality of frequency domain units, or the quantity of layers to be scheduled corresponding to each frequency domain unit group in the one or more frequency domain unit groups; and the third indication information is used by the network device to determine the first indication information.

In a possible implementation, the network device determines, based on a quantity of frequency domain resources corresponding to each frequency domain unit, a correspondence between a frequency domain resource in an active band and each frequency domain unit in the plurality of frequency domain units, where the quantity of frequency domain resources corresponding to the frequency domain unit is pre-specified in a protocol; or the network device determines, based on a quantity of frequency domain resources corresponding to each frequency domain unit in each frequency domain unit group, a correspondence between each frequency domain unit in each frequency domain unit group in the one or more frequency domain unit groups and a frequency domain resource in an active band, where the quantity of frequency domain resources corresponding to each frequency domain unit in the frequency domain unit group is pre-specified in a protocol.

In a possible implementation, the network device sends fourth indication information to the terminal device, where the fourth indication information indicates the correspondence between the frequency domain resource in the active band and each frequency domain unit in the plurality of frequency domain units, or the fourth indication information indicates the correspondence between the frequency domain resource in the active band and each frequency domain unit in the one or more frequency domain unit groups.

According to a third aspect, embodiments provide a resource scheduling method. The method may be applied to a terminal device, or may be applied to a component (a chip, a processor, or the like) of the terminal device. For example, the method is applied to the terminal device. The method includes: The terminal device determines third indication information, where the third indication information indicates a quantity of layers to be scheduled corresponding to each frequency domain unit in a plurality of frequency domain units, and a correspondence between a frequency domain resource in a reporting band and each frequency domain unit in the plurality of frequency domain units, or the third indication information indicates a quantity of layers to be scheduled corresponding to each frequency domain unit group in one or more frequency domain unit groups, and a correspondence between a frequency domain resource in a reporting band and each frequency domain unit in the one or more frequency domain unit groups; and the terminal device determines, based on the third indication information, a quantity of layers to be scheduled that are on frequency domain resources used by the terminal device for data transmission, where at least two of the frequency domain resources for data transmission have different quantities of layers to be scheduled.

According to the method described in the third aspect, the terminal device measures a channel, and determines, based on an actual condition of the channel, the correspondence between the frequency domain resource in the reporting band and each frequency domain unit, or determines the correspondence between the frequency domain resource in the reporting band and each frequency domain unit in the one or more domain unit groups. In this way, accuracy of division of frequency domain units is improved, a waste of frequency domain resources is avoided, and spectrum utilization is improved. As the correspondence between the frequency domain resource and the frequency domain unit is determined based on a frequency domain correlation of a channel, it may be understood as that the correspondence between the frequency domain resource and the frequency domain unit adapts a frequency selection characteristic of the channel. In addition, the terminal device may perform differentiated scheduling on a quantity of layers to be scheduled that are in each frequency domain unit or a quantity of layers to be scheduled corresponding to each frequency domain unit group, to further improve flexibility of resource scheduling.

In a possible implementation, the third indication information includes a first bitmap, one bit in the first bitmap corresponds to one frequency domain unit, and the bit is used to determine a quantity of layers to be scheduled that are in the frequency domain unit corresponding to the bit.

In a possible implementation, for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit includes the frequency domain resource.

In a possible implementation, the third indication information includes a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

In a possible implementation, for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. The first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

In a possible implementation, the terminal device determines, based on the quantity of layers to be scheduled that are on the frequency domain resources for data transmission, a demodulation reference signal port in the frequency domain resources for data transmission, where demodulation reference signal ports in at least two of the frequency domain resources for data transmission are different.

In a possible implementation, the demodulation reference signal port is a DMRS port.

In a possible implementation, for one frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

In a possible implementation, the terminal device receives second indication information, where the second indication information includes an index value that is in a demodulation reference signal port table and that corresponds to the frequency domain resources for data transmission; each index value in the demodulation reference signal port table corresponds to a plurality of quantities of demodulation reference signal ports; and for one frequency domain resource for data transmission, a demodulation reference signal port in the frequency domain resource is a first demodulation reference signal port, where a quantity of first demodulation reference signal ports corresponds to the index value, and the quantity of first demodulation reference signal ports is the same as a quantity of layers to be scheduled that are on the frequency domain resource.

According to a fourth aspect, embodiments provide a communication apparatus. The apparatus may be an apparatus in a terminal device or an apparatus that can be used together with a terminal device. The communication apparatus may alternatively be a chip system. The communication apparatus may perform the method according to the first aspect or the third aspect. A function of the communication apparatus may be implemented by hardware, or may be implemented by hardware by executing corresponding software. The hardware or the software includes one or more units corresponding to the foregoing function. The unit may be software and/or hardware. For an operation performed by the communication apparatus and beneficial effect thereof, refer to the method and the beneficial effect in the first aspect or the third aspect. Repeated content is not described again.

According to a fifth aspect, embodiments provide a communication apparatus. The apparatus may be an apparatus in a network device or an apparatus that can be used together with a network device. The communication apparatus may alternatively be a chip system. The communication apparatus may perform the method according to the second aspect. A function of the communication apparatus may be implemented by hardware, or may be implemented by hardware by executing corresponding software. The hardware or the software includes one or more units corresponding to the foregoing function. The unit may be software and/or hardware. For an operation performed by the communication apparatus and beneficial effect thereof, refer to the method and the beneficial effect in the second aspect. Repeated content is not described again.

According to a sixth aspect, a communication apparatus is provided. The communication apparatus may be the terminal device in the method embodiment according to the first aspect or the method embodiment according to the third aspect, or a chip disposed in a terminal device; or the communication apparatus may be the network device in the method embodiment according to the second aspect, or a chip disposed in a network device. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus performs the method performed by the terminal device in the method embodiment according to the first aspect or the method embodiment according to the third aspect, or the communication apparatus performs the method performed by the network device in the method embodiment according to the second aspect.

According to a seventh aspect, embodiments provide a computer-readable storage medium. The computer-readable storage medium is configured to store computer-executable instructions. When the computer-executable instructions are executed, the method performed by the terminal device in the method according to the first aspect or the third aspect is implemented.

According to an eighth aspect, embodiments provide a chip. The chip includes a processor and an interface circuit. When the processor in the chip is configured to invoke program instructions, the method performed by the terminal device in the method according to the first aspect or the third aspect is implemented, or the method performed by the network device in the method according to the second aspect is implemented.

According to a ninth aspect, embodiments provide a computer program product for a computer program. When the computer program is executed, the method performed by the terminal device in the method according to the first aspect or the third aspect is implemented, or the method performed by the network device in the method according to the second aspect is implemented.

BRIEF DESCRIPTION OF DRAWINGS

FIG. 1 is a schematic diagram of a system architecture according to embodiments;

FIG. 2*a* is a schematic diagram indicated by a type of frequency domain resource scheduling according to embodiments;

FIG. 2*b* is a schematic diagram indicated by another type of frequency domain resource scheduling according to embodiments;

FIG. 3*a* is a schematic flowchart of a resource scheduling method according to embodiments;

FIG. 3*b* is a schematic diagram of a specific implementation in which a terminal device obtains first indication information according to embodiments;

FIG. 4 is a schematic diagram of a frequency domain unit according to embodiments;

FIG. 5 is a schematic diagram of a frequency domain unit group according to embodiments;

FIG. 6*b* is a schematic diagram of another type of first indication information according to embodiments;

FIG. 6*c* is a schematic diagram of still another type of first indication information according to embodiments;

FIG. 7*d* is still another schematic diagram of determining a quantity of layers to be scheduled that are on a frequency domain resource according to embodiments;

FIG. 8 is a schematic flowchart of another resource scheduling method according to embodiments;

FIG. 9*a* is a schematic flowchart of a method in which a terminal device divides a frequency domain resource in a band according to embodiments;

FIG. 9*b* is a schematic diagram of another correspondence between a frequency domain unit and a frequency domain resource according to embodiments;

FIG. 9*c* is a schematic diagram of another correspondence between a frequency domain unit and a frequency domain resource according to embodiments;

FIG. 10 is a schematic flowchart of another method in which a terminal device divides a frequency domain resource in a band according to embodiments;

FIG. 11 is a schematic flowchart of still another resource scheduling method according to embodiments;

DETAILED DESCRIPTION OF EMBODIMENTS

Figure 6A:
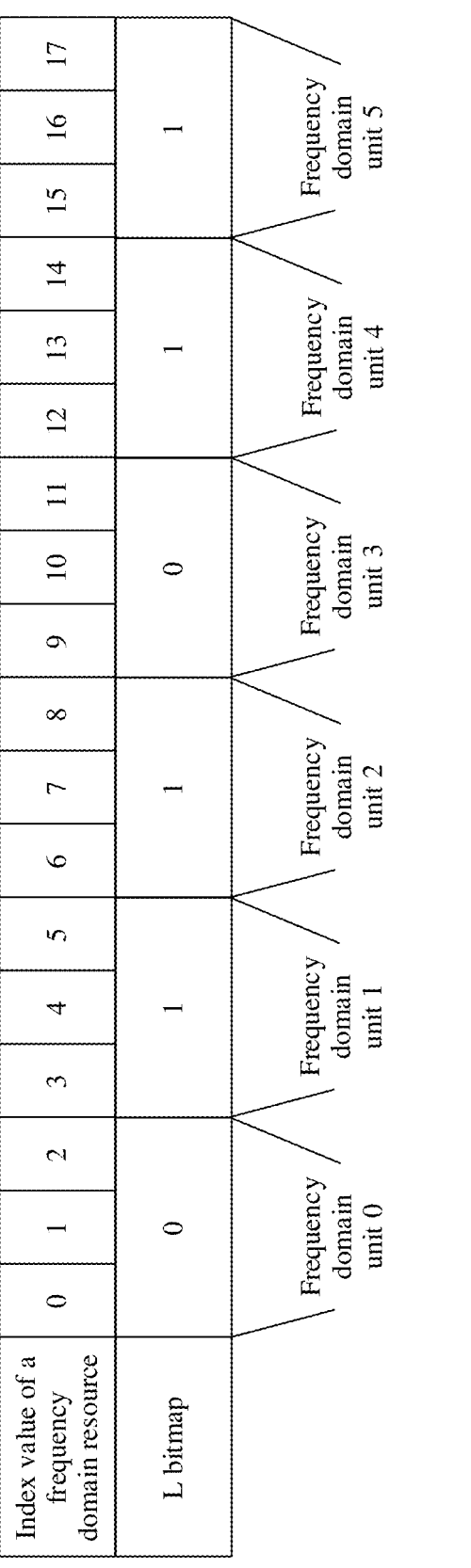
FIG. 6*a* is a schematic diagram of a type of first indication information according to embodiments.

To make the objectives, solutions, and advantages clearer, embodiments are further described below in detail with reference to the accompanying drawings.

The terms "first", "second", and the like in the embodiments and the accompanying drawings are used to distinguish between different objects, and are not intended to describe a specific order. In addition, the terms "include", "have", or any other variant thereof are intended to cover a non-exclusive inclusion. For example, a process, a method, a system, a product, or a device that includes a series of operations or units is not limited to the operations or units listed above, and optionally, further includes an operation or a unit that is not listed herein, or optionally, further includes an operation or a unit inherent for the process, the method, the product, or the device.

An "embodiment" means that a particular feature, structure, or characteristic described with reference to the embodiment may be included in at least one embodiment. The word may neither necessarily mean a same embodiment, nor mean an independent or optional embodiment exclusive from another embodiment. It is explicitly and implicitly understood by a person skilled in the art that an embodiment may be combined with another embodiment.

In embodiments, "at least one (item)" means one or more, "a plurality of" means two or more, and "at least two (items)" means two, three, or more. "and/or" is used for describing a correspondence between corresponding objects, and represents that three relationships may exist. For example, "A and/or B" may represent the following three cases: only A exists, only B exists, and both A and B exist, where A and B may be singular or plural. The character "/" can indicate an "or" relationship between corresponding objects. "At least one of the following items (pieces)" or a similar expression thereof means any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

To better understand the solutions provided in embodiments, a system architecture in embodiments is first described below.

Refer to FIG. 1. FIG. 1 is a schematic diagram of a system architecture according to embodiments. As shown in FIG. 1, the system architecture includes a terminal device and a network device. The terminal device may also be referred to as user equipment (UE), and the network device may also be referred to as an access network device. In FIG. 1, a communication system includes UE 1, UE 2, UE 3, UE 4, UE 5, UE 6, and a network device 10. In the communication system, the UE 1, the UE 2, the UE 3, the UE 4, the UE 5, and the UE 6 may send uplink data to the network device 10, and the network device 10 may further send downlink data to the UE 1, the UE 2, the UE 3, the UE 4, the UE 5, and the UE 6. It should be understood that a quantity of terminal devices is merely an example, and the quantity of terminal devices is not limited in embodiments.

The terminal device and the network device in FIG. 1 are separately described in detail below.

1. Terminal Device

The terminal device includes a device that provides voice and/or data connectivity for a user, for example, may include a handheld device having a wireless connection function or a processing device connected to a wireless modem. The terminal device may communicate with a core network through a radio access network (RAN), and exchange voice and/or data with the RAN. The terminal device may include a wireless terminal device, a mobile terminal device, a device-to-device (D2D) terminal device, a vehicle-to-everything (V2X) terminal device, a machine-to-machine/machine-type communication (M2M/MTC) terminal device, an Internet of Things (IoT) terminal device, a subscriber unit, a subscriber station, a mobile station, a remote station, an access point (AP), a remote terminal, an access terminal, a user terminal, a user agent, user equipment, or the like. For example, the terminal device may include a mobile phone (also referred to as a "cellular" phone), a computer with a mobile terminal device, and a portable, pocket-sized, hand-held, or computer built-in mobile apparatus. For example, the terminal device may include a personal communication service (PCS) phone, a cordless phone, a session initiation protocol (SIP) phone, a wireless local loop (WLL) station, a personal digital assistant (PDA), or another device. The terminal device further includes a limited device, for example, a device with low power consumption, a device with a limited storage capability, or a device with a limited computing capability. For example, the terminal device includes an information sensing device, for example, a bar code, a radio frequency identification (RFID) device, a sensor, a global positioning system (GPS), or a laser scanner.

2. Network Device

The network device is an entity, on a network side, for transmitting or receiving a signal, and may be configured to perform mutual conversion between a received air frame and an Internet protocol (IP) packet, and serve as a router between a terminal device and other parts of an access network. The other parts of the access network may include an IP network or the like. The access network device may further coordinate attribute management for an air interface. For example, the access network device may be an evolved NodeB (eNB or e-NodeB) in LTE, may be a new radio controller (NR controller), may be an ng-eNB, may be a gNodeB (gNB) in a 5G system, may be a central unit, may be a new radio base station, may be a remote radio module, may be a micro base station, may be a relay, may be a distributed unit, may be a transmission reception point (TRP), a transmission point (TP), or any other radio access device. However, this is not limited in embodiments.

It may be understood that the communication system in FIG. 1 includes, but is not limited to, a 5G communication system, an Internet of Things (IoT) system, a narrow band Internet of Things (NB-IoT) system, an LTE-5G hybrid architecture, a 5G new radio (NR) system, a future 6th generation (6G) communication system, or a new communication system emerging during development of communication in the future. The foregoing network element or function may be a network element in a hardware device, may be a software function run on dedicated hardware, or may be an instantiated virtualized function on a platform (for example, a cloud platform). Optionally, the foregoing network element or function may be implemented by one device, may be jointly implemented by a plurality of devices, or may be one functional module in one device. This is not limited in embodiments.

Related features in embodiments are described below. It should be noted that these descriptions are intended to make embodiments easier to be understood, and should not be considered as a limitation of the background technology on the scope of the embodiments.

1. Quantity of Layers to be Scheduled that are on a Frequency Domain Resource

The quantity of layers to be scheduled that are on the frequency domain resource may also be referred to as a quantity of transport streams on the frequency domain resource (which may also be understood as a quantity of layers to be scheduled that are at a spatial layer), and means that when transmitting data, a transmit end may divide data to be transmitted into a plurality of data layers for transmission on the frequency domain resource, that is, a plurality of layers of data are transmitted in parallel on the same frequency domain resource. In such a transmission manner, effect of spatial multiplexing can be achieved.

A manner of determining a maximum quantity P of layers to be scheduled by the terminal device that are on a frequency domain resource for data transmission is as follows: determining P based on a quantity of demodulation reference signal (DMRS) ports indicated by downlink control information (DCI). In other words, it may be understood as that, it is determined that the quantity of demodulation reference signal ports is the maximum quantity P of layers to be scheduled that are on the frequency domain resources for data transmission. For example, the terminal device receives the DCI from the network device. The DCI carries an identifier of an antenna port. The terminal device determines an index value in a DMRS configuration table based on the identifier of the antenna port. In other words, the identifier of the antenna port corresponds to the index value in the DMRS configuration table. The identifier of the antenna port may be considered as the index value in the DMRS configuration table. Further, the terminal device may obtain a quantity of DMRS ports by looking up in the DMRS configuration table based on the index value, and determine that the obtained quantity of DMRS ports is the maximum quantity P of layers to be scheduled that are on the frequency domain resources for data transmission. It should be understood that a quantity P of layers to be scheduled in the following descriptions is a maximum quantity of layers to be scheduled that are on a frequency domain resource for data transmission, and a manner of determining the maximum quantity P of layers to be scheduled is not described again below.

For example, refer to Table 1. Table 1 is a DMRS configuration table provided in this embodiment.

TABLE 1

| One codeword: Codeword 0 enabled, and codeword 1 disabled | | | |
| --- | --- | --- | --- |
| Index value | Quantity of DMRS CDM groups without data | DMRS port | Quantity of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |

When the identifier of the antenna port in the DCI is 10, the DMRS port in the frequency domain resource is a DMRS port 0 to a DMRS port 3, that is, the quantity of DMRS ports is 4, and the maximum quantity of layers to be scheduled by the terminal device that are on the frequency domain resources for data transmission is 4.

It should be noted that the frequency domain resource mentioned in embodiments may be a resource block (RB) or a resource block group (resource block group, RBG).

2. Manner of Frequency Domain Resource Allocation

There are two types of frequency domain resource allocation according to the 3rd generation partnership project (3GPP) standards, that is, a resource allocation type 0 (resource allocation type 0, referred to as a type 0 below) and a resource allocation type 1 (resource allocation type 1, referred to as a type 1 below).

In the type 0, for a frequency domain resource, frequency domain resource scheduling is performed at granularity of RBGs, and index values of RBGs invoked by a user terminal device may be discontinuous. For example, as shown in FIG. 2a, frequency domain resources are shown at granularity of RBGs, and a bitmap is used to indicate scheduling of an RBG in a frequency domain resource. For example, it may be understood as that when a value of a bit in the bitmap is 1, an RBG corresponding to the bit is scheduled, and when a value of a bit in the bitmap is 0, an RBG corresponding to the bit is not scheduled. It can be understood from a bitmap indication in FIG. 2a that an RBG that is scheduled includes an RBG 0, an RBG 3, an RBG 4, an RBG 7, and an RBG 8, and an RBG that is not scheduled includes an RBG 1, an RBG 2, an RBG 5, an RBG 6, and an RBG 9.

In the type 1, for a frequency domain resource, frequency domain resource scheduling is performed at granularity of RBs, and index values of RBs invoked by a user terminal device are continuous. Frequency domain resource scheduling information indicated by a network device to the user terminal device indicates a start RB and a quantity of consecutively allocated RBs. For example, as shown in FIG. 2b, frequency domain resources are shown at granularity of RBs in FIG. 2b (that is, each small square in FIG. 2b represents one RB). The frequency domain resource scheduling information sent by the network device includes that the start RB, that is, an RB 2, and the quantity of consecutively allocated RBs, that is, six RBs. In this case, an RB that is scheduled includes an RB 2, an RB 3, an RB 4, an RB 5, an RB 6, and an RB 7, and an RB that is not scheduled includes an RB 0, an RB 1, an RB 8, and an RB 9.

3. Frequency Selection Characteristic

The frequency selection characteristic of a channel is also referred to as channel frequency selectivity, and means that an electromagnetic wave sent by a transmit end is refracted when passing through an obstacle, and a multipath effect is caused. Electromagnetic waves transmitted from a transmit antenna at the same time arrive at a receive antenna along different directions at different times. An electromagnetic field effect of the receive antenna is superposed, and multipath components are mixed up. In time domain, a reason for such a waveform change is superposition of signals on different propagation paths. According to the principle of Fourier transform, seen from frequency domain, characteristics of different channels in the frequency domain are different.

With iterative development of communication systems, a bandwidth becomes increasingly large, a quantity of terminal devices that a communication system can accommodate also increases rapidly, and a system throughput is also greatly improved. However, with the iterative development of communication systems, some hidden defects of the systems become increasingly conspicuous. For example, an increase in a quantity of terminal devices causes greater interference between signals, and there is increasingly frequent fluctuation of frequency domain resource scheduling, resulting in a more conspicuous frequency selection characteristic of a channel. In addition, a larger system bandwidth and some precoding weight design algorithms (such as an air interface iterative design method) are also important factors that make the frequency selection characteristic of the channel more conspicuous. In this case, when a terminal device needs to schedule a frequency domain resource, the frequency domain resource is expected to be scheduled in a flexible manner of scheduling for data transmission, to adapt to the frequency selection characteristic of the channel and improve spectrum utilization.

Embodiments provide a resource scheduling method, so that when a terminal device simultaneously schedules a plurality of frequency domain resources to improve a throughput, a quantity of layers to be scheduled that are on each frequency domain resource can be selected and configured differently, to improve flexibility of resource scheduling in a communication system. As a correspondence between a frequency domain resource and a frequency domain unit is determined based on a frequency domain correlation of a channel, it may be understood as that the correspondence between the frequency domain resource and the frequency domain unit adapts a frequency selection characteristic of the channel. In addition, a quantity of layers to be scheduled that are on each frequency domain resource may be flexibly configured based on an actual application scenario, to avoid a waste of frequency domain resources, thereby improving spectrum utilization.

The resource scheduling method provided in embodiments is further described below in detail.

Refer to FIG. 3a. FIG. 3a is a schematic flowchart of a resource scheduling method according to an embodiment. As shown in FIG. 3a, the resource scheduling method includes S301 and S302. The method shown in FIG. 3a may be performed by a terminal device, or may be performed by a chip in a terminal device. An example in which the method is performed by a terminal device is used in FIG. 3a for description. For example:

S301: A terminal device obtains first indication information.

The first indication information is used to determine a quantity of layers to be scheduled corresponding to each frequency domain unit in a plurality of frequency domain units, or is used to determine a quantity of layers to be scheduled corresponding to each frequency domain unit group in one or more frequency domain unit groups. The frequency domain unit group includes one or more frequency domain units, and one or more frequency domain resources in one frequency domain unit have a same quantity of layers to be scheduled.

It should be noted that a specific implementation in which the terminal device obtains the first indication information may include the following two manners.

Manner 1: As shown in S301 in FIG. 3b, the terminal device receives the first indication information sent by a network device, where the first indication information may be DCI information and is carried on a physical downlink control channel (PDCCH). The network device sends the first indication information to the terminal device based on an actual application scenario, to flexibly configure a quantity of layers to be scheduled that are on each frequency domain resource, and avoid a waste of frequency domain resources, thereby improving spectrum utilization.

Manner 2: The terminal device obtains the first indication information from a protocol, and it may be understood as that the terminal device may determine, according to the protocol, the quantity of layers to be scheduled corresponding to each frequency domain unit, or determine, according to the protocol, the quantity of layers to be scheduled corresponding to each frequency domain unit group in the one or more frequency domain unit groups.

For ease of understanding, the frequency domain unit and the frequency domain unit group are first described below.

The frequency domain unit may be understood as including a plurality of frequency domain resources (RBs or RBGs). As shown in FIG. 4, there are 20 frequency domain resources and seven frequency domain units in FIG. 4. A frequency domain unit 0 corresponds to a frequency domain resource 0 to a frequency domain resource 2, a frequency domain unit 1 corresponds to a frequency domain resource 3 to a frequency domain resource 5, a frequency domain unit 2 corresponds to a frequency domain resource 6 to a frequency domain resource 8, a frequency domain unit 3 corresponds to a frequency domain resource 9 to a frequency domain resource 11, a frequency domain unit 4 corresponds to a frequency domain resource 12 to a frequency domain resource 14, a frequency domain unit 5 corresponds to a frequency domain resource 15 to a frequency domain resource 17, and a frequency domain unit 6 corresponds to a frequency domain resource 18 and a frequency domain resource 19. Each frequency domain resource in a frequency domain unit has a same quantity of layers to be scheduled. For example, each frequency domain resource (the frequency domain resource 0, the frequency domain resource 1, and the frequency domain resource 2) in the frequency domain unit 0 in FIG. 4 have a same quantity of layers to be scheduled. Each of the frequency domain units may have different quantities of layers to be scheduled. For example, in FIG. 4, a quantity of layers to be scheduled that are in the frequency domain unit 0 may be different from a quantity of layers to be scheduled that are in the frequency domain unit 1, or it may be understood as that a quantity of layers to be scheduled that are on each frequency domain resource (that is, the frequency domain resource 0, the frequency domain resource 1, and the frequency domain resource 2) in the frequency domain unit 0 may be different from a quantity of layers to be scheduled that are on each frequency domain resource (that is, the frequency domain resource 3, the frequency domain resource 4, and the frequency domain resource 5) in the frequency domain unit 1.

The frequency domain unit group may be understood as including one or more frequency domain units. As shown in FIG. 5, there are 20 frequency domain resources and two frequency domain unit groups (a frequency domain unit group 1 and a frequency domain unit group 2) in FIG. 5. The frequency domain unit group 1 includes seven frequency domain units, that is, a frequency domain unit 10, a frequency domain unit 11, a frequency domain unit 12, a frequency domain unit 13, a frequency domain unit 14, a frequency domain unit 15, and a frequency domain unit 16. The frequency domain unit group 2 includes four frequency domain units, that is, a frequency domain unit 20, a frequency domain unit 21, a frequency domain unit 22, and a frequency domain unit 23.

Based on this, as the first indication information is used to determine the quantity of layers to be scheduled corresponding to each frequency domain unit in the plurality of frequency domain units, or is used to determine the quantity of layers to be scheduled corresponding to each frequency domain unit group in the one or more frequency domain unit groups. A form of the first indication information is described below in detail with the following two cases.

Case 1: The first indication information is used to determine the quantity of layers to be scheduled corresponding to each frequency domain unit in the plurality of frequency domain units.

This may be understood as that frequency domain resources are divided into a plurality of frequency domain units, each frequency domain unit corresponds to at least one (or one or more) frequency domain resource, and each frequency domain resource in a same frequency domain unit has a same quantity of layers to be scheduled. In this case, the first indication information is used to determine a quantity of layers to be scheduled corresponding to each frequency domain unit, and it may be understood as that the terminal device determines a quantity of layers to be scheduled that are on each frequency domain resource.

In a possible implementation, the first indication information is a first bitmap, one bit (such as a bit in a bitmap) in the first bitmap is in a one-to-one correspondence with one frequency domain unit, and the bit in the first bitmap is used to determine a quantity of layers to be scheduled that are on a frequency domain resource in the frequency domain unit corresponding to the bit. It should be noted that the bitmap includes a plurality of bits, and a value of each bit in the bitmap is 0 or 1.

In other words, when the first indication information is a bitmap, a quantity of layers to be scheduled that are in a frequency domain unit corresponding to one bit may be indicated, based on a correspondence between the bit and the frequency domain unit, by a value of the bit in the bitmap. In an example, when a value of a bit in the bitmap is 1, it indicates that a quantity of layers to be scheduled that are in a frequency domain unit corresponding to the bit is P layers; or when a value of a bit in the bitmap is 0, it indicates that a quantity of layers to be scheduled that are in a frequency domain unit corresponding to the bit is P−1 layers. In embodiments, P is a maximum quantity of layers to be scheduled by the terminal device that are on a frequency domain resource for data transmission, and P is an integer greater than or equal to 2. For a specific manner of determining the maximum quantity P of layers to be scheduled by the terminal device that are on the frequency domain resources for data transmission, refer to the manner of determining the maximum quantity P of layers to be scheduled by the terminal device that are on the frequency domain resources for data transmission described above. Details are not described herein again. In another example, a quantity of layers to be scheduled corresponding to a value of each bit is preset. For example, a manner of setting the quantity of layers to be scheduled corresponding to the value of each bit may be that the network device sends indication information to the terminal device in advance for setting, or the quantity may be specified in a protocol. For example, the network device sends the indication information to the terminal device in advance. The indication information indicates that when a value of a bit in a bitmap is 0, a quantity of layers to be scheduled that are in a frequency domain unit corresponding to the bit is one layer; or when a value of a bit in a bitmap is 1, a quantity of layers to be scheduled that are in a frequency domain unit corresponding to the bit is three layers.

It should be noted that, an index value of a frequency domain resource corresponding to a low-order bit in a bitmap in embodiments is greater than an index value of a frequency domain resource corresponding to a high-order bit in the bitmap, as in the embodiments. Details are not described again below. For example, as shown in FIG. 6a, the first indication information is an L bitmap, that is, a bitmap whose length is L bits, where L is a quantity of frequency domain units. From the most significant to the least significant, bits in the L bitmap sequentially include a bit corresponding to a frequency domain unit 0, a bit corresponding to a frequency domain unit 1, a bit corresponding to a frequency domain unit 2, a bit corresponding to a frequency domain unit 3, a bit corresponding to a frequency domain unit 4, and a bit corresponding to a frequency domain unit 5.

For example, refer to FIG. 6a. FIG. 6a is a schematic diagram of a type of first indication information according to embodiments. In the first indication information (that is, the L bitmap in FIG. 6a), a value of the bit corresponding to the frequency domain unit 0 is 0 (that is, a quantity of layers to be scheduled that are in the frequency domain unit 0 is P−1 layers), and a value of the bit corresponding to the frequency domain unit 1 is 1 (that is, a quantity of layers to be scheduled that are in the frequency domain unit 1 is P layers), a value of the bit corresponding to the frequency domain unit 2 is 1 (that is, a quantity of layers to be scheduled that are in the frequency domain unit 2 is P layers), a value of the bit corresponding to the frequency domain unit 3 is 0 (that is, a quantity of layers to be scheduled that are in the frequency domain unit 3 is P−1 layers), a value of the bit corresponding to the frequency domain unit 4 is 1 (that is, a quantity of layers to be scheduled that are in the frequency domain unit 4 is P layers), and a value of the bit corresponding to the frequency domain unit 5 is 1 (that is, a quantity of layers to be scheduled that are in the frequency domain unit 5 is P layers). It can be understood that the first indication information in FIG. 6a indirectly indicates a quantity of layers to be scheduled that are in a frequency domain unit by using a value of a bit corresponding to the frequency domain unit. It should be understood that, in this example, when a value of a bit is 0, a quantity of layers to be scheduled that are in a frequency domain unit corresponding to the bit is P−1 layers; or when a value of a bit is 1, a quantity of layers to be scheduled that are in a frequency domain unit corresponding to the bit is P layers. In another example, when a value of a bit is 1, a quantity of layers to be scheduled that are in the frequency domain unit corresponding to the bit is P layers; or when a value of a bit is 0, a quantity of layers to be scheduled that are in the frequency domain unit corresponding to the bit is P−1 layers. A quantity of layers to be scheduled corresponding to a value of a bit is not limited in embodiments.

In another possible implementation, the first indication information includes information about a quantity of layers to be scheduled corresponding to each frequency domain unit in the plurality of frequency domain units, and it may be understood as that the first indication information includes a plurality of message fields, each message field is in a one-to-one correspondence with each frequency domain unit, and each message field includes indication information about a quantity of layers to be scheduled that are in a frequency domain unit corresponding to the message field. For example, a message field 0 corresponds to a frequency domain unit 0, and information in the message field 0 is "4". In this case, the message field 0 indicates that a quantity of layers to be scheduled that are in the frequency domain unit 0 is four layers. Refer to FIG. 6b. FIG. 6b is a schematic diagram of another type of first indication information according to embodiments. The first indication information includes six message fields, each message field is in a one-to-one correspondence with each frequency domain unit, and each message field includes indication information about a quantity of layers to be scheduled that are in a frequency domain unit corresponding to the message field. Information about a quantity of layers to be scheduled that are in each frequency domain unit is as follows: A message field corresponding to a frequency domain unit 0 carries a value 1 (that is, a quantity of layers to be scheduled that are in the frequency domain unit 0 is one layer), a message field corresponding to a frequency domain unit 1 carries a value 2 (that is, a quantity of layers to be scheduled that are in the frequency domain unit 1 is two layers), a message field corresponding to the frequency domain unit 2 carries a value 4 (that is, a quantity of layers to be scheduled that are in the frequency domain unit 2 is four layers), a message field corresponding to the frequency domain unit 3 carries a value 3 (that is, a quantity of layers to be scheduled that are in the frequency domain unit 3 is three layers), a message field corresponding to the frequency domain unit 4 carries a value 1 (that is, a quantity of layers to be scheduled that are in the frequency domain unit 4 is one layer), and a message field corresponding to the frequency domain unit 5 carries a value 2 (that is, a quantity of layers to be scheduled that are in the frequency domain unit 5 is two layers). It can be understood that the first indication information in FIG. 6b may be used to directly indicate a quantity of layers to be scheduled that are on a frequency domain resource in each frequency domain unit.

Case 2: The first indication information is used to determine the quantity of layers to be scheduled corresponding to each frequency domain unit group in the one or more frequency domain unit groups.

Frequency domain resources are divided into a plurality of frequency domain unit groups, and one of the frequency domain unit groups corresponds to one quantity of layers to be scheduled. For example, as shown in FIG. 5, frequency domain resources are divided into two frequency domain unit groups. Table 2 shows a correspondence, set in a protocol, between a frequency domain unit group and a quantity of layers to be scheduled. It may be understood as that the protocol has indicated that a frequency domain unit group 1 corresponds to one layer to be scheduled, and a frequency domain unit group 2 corresponds to two layers to be scheduled.

19

TABLE 2

| Frequency domain unit group identifier | Quantity of layers to be scheduled |
|---|---|
| Frequency domain unit group 1 | 1 |
| Frequency domain unit group 2 | 2 |

It should be understood that one frequency domain unit group includes one or more frequency domain units, one frequency domain unit includes one or more frequency domain resources, and each frequency domain resource in a same frequency domain unit has a same quantity of layers to be scheduled. It can be understood that, in this case, a quantity of layers to be scheduled corresponding to each frequency domain resource needs to be indicated by using a frequency domain unit to which the frequency domain resource belongs in each frequency domain unit group together. It should be noted that when one frequency domain unit includes one frequency domain resource, the first indication information indicates a quantity of layers to be scheduled corresponding to each frequency domain resource. In embodiments, only a case in which one frequency domain unit includes a plurality of frequency domain resources is described as an example, and should not be considered as a limitation on embodiments.

In a possible implementation, the first indication information includes a second bitmap corresponding to each frequency domain unit group in the one or more frequency domain unit groups. One bit in the second bitmap corresponds to one frequency domain unit in the frequency domain unit group corresponding to the second bitmap, and the frequency domain unit group is in a one-to-one correspondence with the quantity of layers to be scheduled. For each frequency domain unit group in a plurality of frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

For example, refer to FIG. 6c. FIG. 6c is a schematic diagram of still another type of first indication information according to embodiments. In FIG. 6c, 20 frequency domain resources correspond to two frequency domain unit groups (a frequency domain unit group 1 and a frequency domain unit group 2). A quantity of layers to be scheduled corresponding to the frequency domain unit group 1 is one layer, and a quantity of layers to be scheduled corresponding to the frequency domain unit group 2 is two layers. The first indication information is a plurality of second bitmaps, that is, an L1 bitmap corresponding to the frequency domain unit group 1 and an L2 bitmap corresponding to the frequency domain unit group 2 in FIG. 6c. Each bit in the L1 bitmap is in a one-to-one correspondence with each frequency domain unit in the frequency domain unit group 1, and the frequency domain unit group 1 includes six frequency domain units, that is, L1=6. Each bit in the L2 bitmap is in a one-to-one correspondence with each frequency domain unit in the frequency domain unit group 2. If the first value is 1, in this case, the first indication information is used to determine that a quantity of layers to be scheduled that are in the frequency domain unit group 1 is a quantity of layers to be scheduled that are in a frequency domain unit of which a value of a bit is 1 in the frequency domain unit group 1. For example, in the frequency domain unit group 1 counted from left, a quantity of layers to be scheduled that are in the second frequency domain unit, a quantity of layers to be scheduled that are in the third frequency domain unit, and a quantity of layers to be scheduled that are in the fourth frequency domain unit to right are all one layer (the quantity of layers to be scheduled corresponding to the frequency domain unit group 1), and in the frequency domain unit group 2 counted from left to right, both a quantity of layers to be scheduled that are in the third frequency domain unit and a quantity of layers to be scheduled that are in the fourth frequency domain unit are two layers (that is, the quantity of layers to be scheduled corresponding to the frequency domain unit group 2).

It should be noted that, in embodiments, only a case in which the first value is 1 is used as an example for description, and the first value is not limited. It may be understood as that the first value may be 0 or 1. In addition, the plurality of frequency domain unit groups may correspond to one bitmap, and the bitmap includes bits in a plurality of rows and a plurality of columns. For example, the L1 bitmap and the L2 bitmap in FIG. 6c may be considered as one second bitmap as a whole. For example, the L1 bitmap may be in a first row in the second bitmap, and the L2 bitmap may be in a second row in the second bitmap.

S302: The terminal device determines, based on the first indication information, a quantity of layers to be scheduled that are on frequency domain resources used by the terminal device for data transmission, where at least two of the frequency domain resources for data transmission have different quantities of layers to be scheduled.

The terminal device receives resource allocation (RA) information from the network device, determines, based on the RA information, the frequency domain resource used by the terminal device for data transmission, and determines, based on the first indication information, the quantity of layers to be scheduled that are on the frequency domain resources for data transmission. The RA information may be a bitmap corresponding to the foregoing frequency domain resource allocation manner, the type 0; or the RA information may be scheduling information corresponding to the foregoing frequency domain resource allocation manner, the type 1, where the scheduling information indicates a start RB and a quantity of consecutively allocated RBs. It may be understood that, in embodiments, it is a precondition that the terminal device receives the RA information sent by the network device, and determines, based on the RA information, the frequency domain resource for data transmission. However, a sequence in which the terminal device receives the first indication information and receives the RA information is not limited in embodiments.

Based on the two cases of the first indication information in S301, that the terminal device determines the quantity of layers to be scheduled that are on the frequency domain resources for data transmission may further be classified into the following two cases.

Case 1: Corresponding to Case 1 in S301, the first indication information is used to determine the quantity of layers to be scheduled corresponding to each frequency domain unit in the plurality of frequency domain units.

In a possible implementation, for each frequency domain resource in the frequency domain resources for data transmission, a quantity of layers to be scheduled that are on the frequency domain resource is a quantity of layers to be scheduled that is determined based on a bit corresponding to a first frequency domain unit. The first frequency domain unit is a frequency domain unit to which the frequency domain resource belongs. In other words, the terminal device determines a plurality of frequency domain resources for data transmission, and determines a frequency domain unit (that is, the first frequency domain unit) corresponding to each frequency domain resource in the plurality of frequency domain resources for data transmission. For each frequency domain resource for data transmission, the terminal device determines that a quantity of layers to be scheduled that is indicated by a bit corresponding to a first frequency domain unit corresponding to the frequency domain resource is a quantity of layers to be scheduled that are on the frequency domain resource.

Figure 7A:
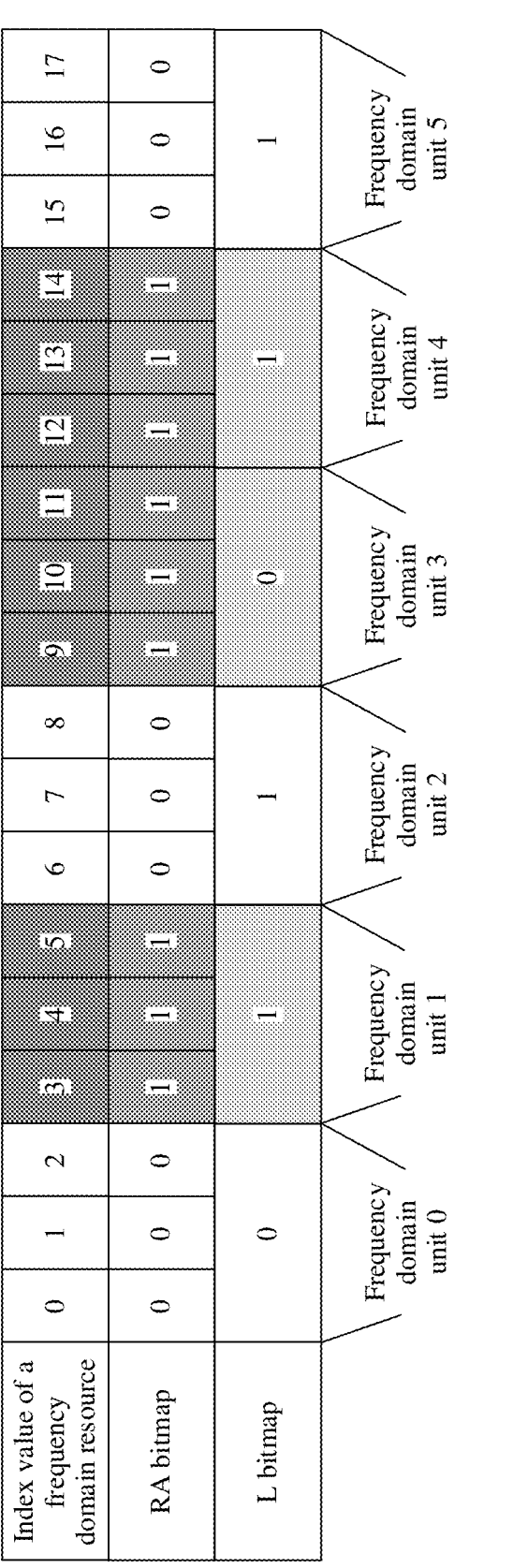
FIG. 7*a* is a schematic diagram of determining a quantity of layers to be scheduled that are on a frequency domain resource according to embodiments.

For example, the resource allocation information is scheduling information in the type 0, that is, the resource allocation information is a bitmap (the bitmap is referred to as an RA bitmap). A bit in the RA bitmap is in a one-to-one correspondence with a frequency domain resource. When a value of the bit in the RA bitmap is 1, it is determined that a frequency domain resource corresponding to the bit is a frequency domain resource for data transmission. Refer to FIG. 7a. In FIG. 7a, the frequency domain resources for data transmission determined by the terminal device based on an indication of the RA bitmap include a frequency domain resource 3 to a frequency domain resource 5 and a frequency domain resource 9 to a frequency domain resource 14. The terminal device determines first frequency domain units corresponding to the frequency domain resources for data transmission, that is, a frequency domain unit 1 (a frequency domain unit corresponding to the frequency domain resource 3 to the frequency domain resource 5), a frequency domain unit 3 (a frequency domain unit corresponding to the frequency domain resource 9 to a frequency domain resource 11), and a frequency domain unit 4 (a frequency domain unit corresponding to a frequency domain resource 12 to the frequency domain resource 14). Further, the terminal device determines, based on the first indication information (an L bitmap in FIG. 7a), a quantity of layers to be scheduled that are in each first frequency domain unit. Values of bits corresponding to the frequency domain unit 1 and the frequency domain unit 4 each are 1, and quantities of layers to be scheduled that are in the frequency domain unit 1 and the frequency domain unit 4 each are P layers. A value of a bit corresponding to the frequency domain unit 3 is 0, and a quantity of layers to be scheduled that are in the frequency domain unit 3 is P–1 layers. A quantity of layers to be scheduled that are on each frequency domain resource for transmission determined by the terminal device is as follows: A quantity of layers to be scheduled that are on the frequency domain resource 3 to the frequency domain resource 5 (corresponding to the frequency domain unit 1) is P layers, a quantity of layers to be scheduled that are on the frequency domain resource 9 to the frequency domain resource 11 (corresponding to the frequency domain unit 3) is P–1 layers, and a quantity of layers to be scheduled that are on the frequency domain resource 12 to the frequency domain resource 14 (corresponding to the frequency domain unit 4) is P layers. The P layers may be understood as a maximum quantity of layers to be scheduled that are on the frequency domain resources used by the terminal device for data transmission.

Figure 7B:
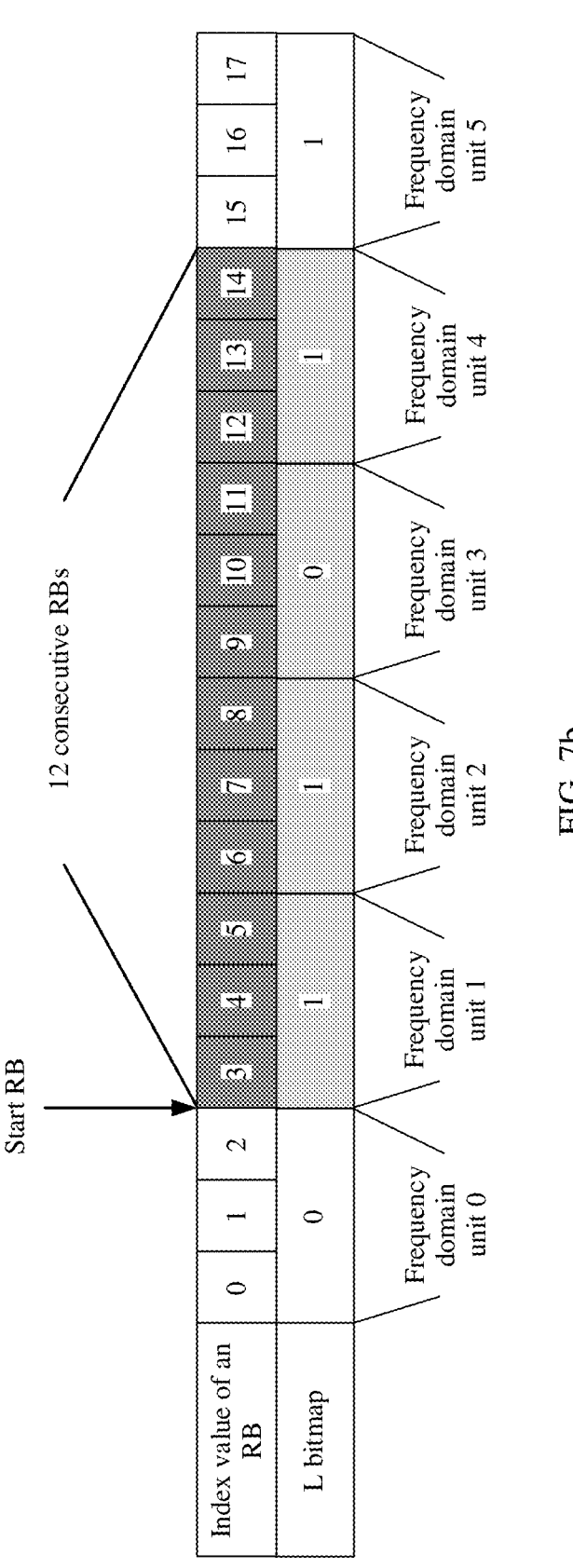
FIG. 7*b* is another schematic diagram of determining a quantity of layers to be scheduled that are on a frequency domain resource according to embodiments.

In another example, the resource allocation information is scheduling information in the type 1, and the scheduling information indicates a start RB and a quantity of consecutively allocated RBs. Refer to FIG. 7b. In FIG. 7b, the scheduling information indicates that the start RB is an RB 3, and the quantity of consecutively allocated RBs is 12. In this case, the frequency domain resources for data transmission determined by the terminal device based on the scheduling information include the RB 3 to an RB 14. First frequency domain units, determined by the terminal device, corresponding to the frequency domain resources for data transmission is as follows: a frequency domain unit 1 (a frequency domain unit corresponding to the RB 3 to an RB 5), a frequency domain unit 2 (a frequency domain unit corresponding to an RB 6 to an RB 8), a frequency domain unit 3 (a frequency domain unit corresponding to an RB 9 to an RB 11), and a frequency domain unit 4 (a frequency domain unit corresponding to an RB 12 to the RB 14). Further, the terminal device determines, based on the first indication information (an L bitmap in FIG. 7b), a quantity of layers to be scheduled that are in each first frequency domain unit. Values of bits corresponding to the frequency domain unit 1, the frequency domain unit 2, and the frequency domain unit 4 each are 1, and quantities of layers to be scheduled that are in the frequency domain unit 1, the frequency domain unit 2, and the frequency domain unit 4 each are P layers. A value of a bit corresponding to the frequency domain unit 3 is 0, and a quantity of layers to be scheduled that are in the frequency domain unit 3 is P–1 layers. A quantity of layers to be scheduled that are on each frequency domain resource for transmission determined by the terminal device is as follows: A quantity of layers to be scheduled that are on the RB 3 to the RB 5 (corresponding to the frequency domain unit 1) is P layers, a quantity of layers to be scheduled that are on the RB 6 to the RB 8 (corresponding to the frequency domain unit 2) is P layers, a quantity of layers to be scheduled that are on the RB 9 to the RB 11 (corresponding to the frequency domain unit 3) is P–1 layers, and a quantity of layers to be scheduled that are on the RB 12 to the RB 14 (corresponding to the frequency domain unit 4) is P layers. The P layers may be understood as a maximum quantity of layers to be scheduled that are on the frequency domain resources used by the terminal device for data transmission.

In another possible implementation, when the first indication information includes information about a quantity of layers to be scheduled corresponding to each frequency domain unit in the plurality of frequency domain units (for example, as shown in FIG. 6b), in this case, for one frequency domain resource in the frequency domain resources for data transmission, a quantity of layers to be scheduled that are on the frequency domain resource is obtained based on information about a quantity of layers to be scheduled corresponding to a first frequency domain unit. The first frequency domain unit is a frequency domain unit to which the frequency domain resource belongs. In other words, the terminal device determines a plurality of frequency domain resources for data transmission, and determines a frequency domain unit (that is, the first frequency domain unit) corresponding to each frequency domain resource in the plurality of frequency domain resources for data transmission. For each frequency domain resource for data transmission, the terminal device determines that a quantity of layers to be scheduled corresponding to the first frequency domain unit corresponding to the frequency domain resource is a quantity of layers to be scheduled that are on the frequency domain resource.

Figure 7C:
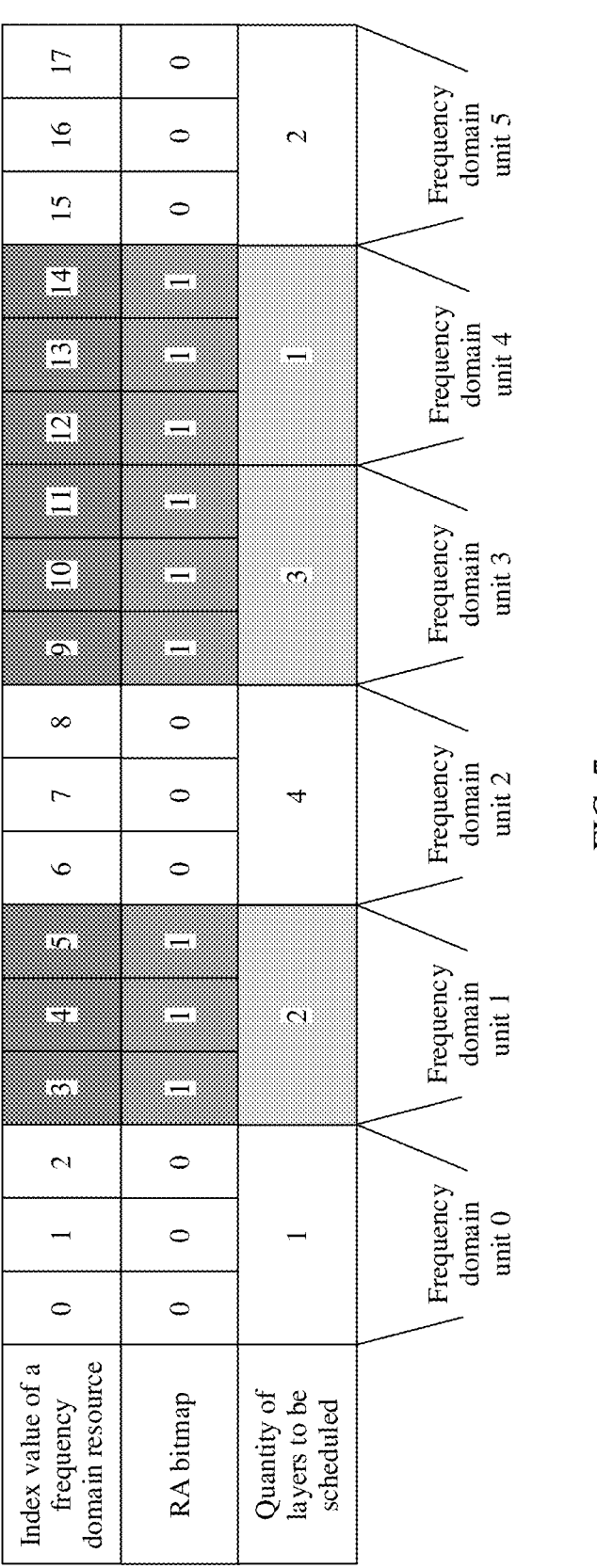
FIG. 7*c* is still another schematic diagram of determining a quantity of layers to be scheduled that are on a frequency domain resource according to embodiments.

For example, refer to FIG. 7c. In FIG. 7c, the frequency domain resources for data transmission determined by the terminal device based on an indication of an RA bitmap include a frequency domain resource 3 to a frequency domain resource 5 and a frequency domain resource 9 to a frequency domain resource 14. The terminal device determines first frequency domain units corresponding to the frequency domain resources for data transmission, that is, a frequency domain unit 1 (a frequency domain unit corresponding to the frequency domain resource 3 to the frequency domain resource 5), a frequency domain unit 3 (a frequency domain unit corresponding to the frequency domain resource 9 to a frequency domain resource 11), and a frequency domain unit 4 (a frequency domain unit corresponding to a frequency domain resource 12 to the frequency domain resource 14). Further, the terminal device determines, based on the first indication information (a quantity, indicated in FIG. 7c, of layers to be scheduled that are in each frequency domain unit), a quantity of layers to be scheduled that are in each first frequency domain unit. If a quantity of layers to be scheduled that are in the frequency domain unit 1 is two layers, a quantity of layers to be scheduled that are on the frequency domain resource 3 to the frequency domain resource 5 corresponding to the frequency domain unit 1 is two layers. If a quantity of layers to be scheduled that are in the frequency domain unit 3 is three layers, a quantity of layers to be scheduled that are on the frequency domain resource 9 to the frequency domain resource 11 corresponding to the frequency domain unit 3 is three layers. If a quantity of layers to be scheduled that are in the frequency domain unit 4 is one layer, a quantity of layers to be scheduled that are on the frequency domain resource 12 to the frequency domain resource 14 corresponding to the frequency domain unit 4 is one layer.

Case 2: Corresponding to Case 2 in S301, the first indication information is used to determine the quantity of layers to be scheduled corresponding to each frequency domain unit group in the one or more frequency domain unit groups.

In a possible implementation, for each frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. If a first frequency domain unit group and a second frequency domain unit group are any two of the one or more frequency domain unit groups, the first frequency domain unit is a frequency domain unit of which a value of a bit is the first value in a frequency domain unit to which the frequency domain resource belongs in the first frequency domain unit group and a frequency domain unit to which the frequency domain resource belongs in the second frequency domain unit group; or the first frequency domain unit is a frequency domain unit to which the frequency domain resource belongs in a frequency domain unit group with a largest or smallest identifier in the first frequency domain unit group and the second frequency domain unit group.

In other words, the terminal device determines a plurality of frequency domain resources for data transmission. Refer to FIG. 7d. FIG. 7d includes an index value of a frequency domain resource, an RA bitmap indicating resource allocation information, an L1 bitmap indicating a quantity of layers to be scheduled that are in the frequency domain unit group 1, and an L2 bitmap indicating a quantity of layers to be scheduled that are in the frequency domain unit group 2. In addition, as shown in Table 2, it is pre-specified in a protocol that the quantity of layers to be scheduled corresponding to the frequency domain unit group 1 is one layer, and the quantity of layers to be scheduled corresponding to the frequency domain unit group 2 is two layers. Based on an indication of the RA bitmap, the frequency domain resources for data transmission determined by the terminal device include a frequency domain resource 0, a frequency domain resource 3 to a frequency domain resource 5, and a frequency domain resource 9 to a frequency domain resource 14. Further, for each frequency domain resource in the plurality of frequency domain resources for data transmission, the terminal device determines a frequency domain unit, in each frequency domain unit group, corresponding to the frequency domain resource. Further, the terminal device determines, based on a quantity of layers to be scheduled that are in the frequency domain unit, in each frequency domain unit group, corresponding to the frequency domain resource, a quantity of layers to be scheduled that are on the frequency domain resource.

If the frequency domain resource corresponds to only one frequency domain unit of which a value of a bit is 1 (the first value) in these frequency domain units, the frequency domain unit of the value of the bit is 1 is a first frequency domain unit. The terminal device determines that a quantity of layers to be scheduled that are in a frequency domain unit group corresponding to the first frequency domain unit is the quantity of layers to be scheduled that are on the frequency domain resource.

For example, the frequency domain resource 3 and a frequency domain resource 12 in the frequency domain resources for data transmission in FIG. 7d are used as an example for description. The frequency domain resource 3 corresponds to the second frequency domain unit in the frequency domain unit group 1 counted from left to right (or it may be considered that the frequency domain resource 3 belongs to the second frequency domain unit in the frequency domain unit group 1). In an indication of the L1 bitmap, a value of a bit of the frequency domain unit is 1 (that is, the first value). The frequency domain resource 3 corresponds to the first frequency domain unit in the frequency domain unit group 2 counted from left to right (or it may be considered that the frequency domain resource 3 belongs to the first frequency domain unit in the frequency domain unit group 2). In an indication of the L2 bitmap, a value of a bit of the frequency domain unit is 0. Further, it may be determined that a first frequency domain unit is the second frequency domain unit, corresponding to the frequency domain resource 3, in the frequency domain unit group 1 counted from left to right, and it is determined that a quantity of layers to be scheduled (that is, the quantity, one layer, of layers to be scheduled that are in the frequency domain unit group 1) that are in the first frequency domain unit is a quantity of layers to be scheduled that are on the frequency domain resource 3. The frequency domain resource 12 corresponds to the fifth frequency domain unit in the frequency domain unit group 1 counted from left to right (or it may be considered that the frequency domain resource 3 belongs to the fifth frequency domain unit in the frequency domain unit group 1). In an indication of the L1 bitmap, a value of a bit of the frequency domain unit is 0. The frequency domain resource 12 corresponds to the third frequency domain unit in the frequency domain unit group 2 counted from left to right (or it may be considered that the frequency domain resource 12 belongs to the third frequency domain unit in the frequency domain unit group 2). In an indication of the L2 bitmap, a value of a bit of the frequency domain unit is 1 (that is, the first value). Further, it may be determined that a first frequency domain unit is the third frequency domain unit, corresponding to the frequency domain resource 12, in the frequency domain unit group 2 counted from left to right, and it is determined that a quantity of layers to be scheduled (that is, a quantity, two layers, of layers to be scheduled that are in the frequency domain unit group 2) that are in the first frequency domain unit is a quantity of layers to be scheduled that are on the frequency domain resource 12.

If the frequency domain resource corresponds to two or more frequency domain units of which values of bits are 1 (the first value) in these frequency domain units, the first frequency domain unit is the frequency domain unit to which the frequency domain resource belongs in the frequency domain unit group with the largest or smallest identifier in the first frequency domain unit group and the second frequency domain unit group.

It should be noted that, in the plurality of frequency domain unit groups, identifiers of the frequency domain unit groups are sorted by quantities of layers to be scheduled corresponding to the frequency domain unit groups. For example, with a larger quantity of layers to be scheduled corresponding to a frequency domain unit group, an identifier of the frequency domain unit group is larger; or with a larger quantity of layers to be scheduled corresponding to a frequency domain unit group, an identifier of the frequency domain unit group is smaller. For example, in FIG. 7*d*, the quantity of layers (two layers) to be scheduled that are in the frequency domain unit group 2 is greater than the quantity of layers (one layer) that are in the frequency domain unit group 1, so that an identifier of the frequency domain unit group 2 is greater than an identifier of the frequency domain unit group 1. The first frequency domain unit group and the second frequency domain unit group are merely examples for description. A quantity of frequency domain unit groups, corresponding to a frequency domain resource, of which values of bits are 1 (the first value) is not limited to 2 in embodiments. For example, a frequency domain resource 0 to a frequency domain resource 19 correspond to three frequency domain unit groups, that is, a frequency domain unit group 1, a frequency domain unit group 2, and a frequency domain unit group 3. A value of a bit of a frequency domain unit 10 corresponding to the frequency domain resource 0 in the corresponding frequency domain unit group 1 is 1 (the first value), a value of a bit of a frequency domain unit 20 corresponding to the frequency domain resource 0 in the corresponding frequency domain unit group 2 is 1 (the first value), and a value of a bit of a frequency domain unit 30 corresponding to the frequency domain resource 0 in the corresponding frequency domain unit group 3 is 1 (the first value). Identifiers of the frequency domain unit groups are sorted in ascending order as follows: the frequency domain unit group 1, the frequency domain unit group 2, and the frequency domain unit group 3. In this case, a first frequency domain unit corresponding to the frequency domain resource 0 may be a frequency domain unit corresponding to the largest identifier of the frequency domain unit group (the frequency domain unit group 3), that is, the frequency domain unit 30; or a first frequency domain unit corresponding to the frequency domain resource 0 may be a frequency domain unit corresponding to the smallest identifier of the frequency domain unit group (the frequency domain unit group 1), that is, the frequency domain unit 10.

For example, a frequency domain resource 9 in the frequency domain resources for data transmission in FIG. 7*d* is used as an example for description. The frequency domain resource 9 corresponds to the fourth frequency domain unit in the frequency domain unit group 1 counted from left to right (or it may be considered that the frequency domain resource 9 belongs to the fourth frequency domain unit in the frequency domain unit group 1). In an indication of the bitmap whose length is L1 bits, a value of a bit of the frequency domain unit is 1 (the first value), and it is determined that the frequency domain unit group 1 is the first frequency domain unit group. The frequency domain resource 9 corresponds to the second frequency domain unit in the frequency domain unit group 2 counted from left to right (or it may be considered that the frequency domain resource 9 belongs to the second frequency domain unit in the frequency domain unit group 2). In an indication of the bitmap whose length is L2 bits, a value of a bit of the frequency domain unit is 1 (the first value), and it may be determined that the frequency domain unit group 2 is the second frequency domain unit group. Because the value of the bit of the frequency domain unit to which the frequency domain resource 9 belongs in the first frequency domain unit group is 1, the value of the bit of the frequency domain unit to which the frequency domain resource 9 belongs in the second frequency domain unit group is 1, and an identifier of the first frequency domain unit group is less than an identifier of the second frequency domain unit group (it may be understood as that a quantity of layers to be scheduled that are in the first frequency domain unit group is less than a quantity of layers to be scheduled that are in the second frequency domain unit group), it is determined that a first frequency domain unit is the second frequency domain unit, corresponding to the frequency domain resource 9, in the frequency domain unit group 2 counted from left to right, and a quantity of layers to be scheduled that are on the frequency domain resource 9 is a quantity of layers to be scheduled that are in the first frequency domain unit, that is, a quantity of layers (two layers) to be scheduled corresponding to the frequency domain unit group 2.

If the frequency domain resource corresponds to no frequency domain unit of which a value of a bit is 1 (the first value) in these frequency domain units, or if a value of a bit of a frequency domain unit to which the frequency domain resource belongs in each frequency domain unit group in the plurality of frequency domain unit groups is 0 (a second value), a quantity of layers to be scheduled that are on the frequency domain resource is a third value determined by a network device. It should be noted that the third value is a maximum quantity P of layers to be scheduled that is indicated by DCI sent by the network device to the terminal device and that is allowed for the terminal device to schedule a frequency domain resource.

For example, a frequency domain resource 0 in the frequency domain resources for data transmission in FIG. 7*d* is used as an example for description. The frequency domain resource 0 corresponds to the first frequency domain unit in the frequency domain unit group 1 counted from left to right (or it may be considered that the frequency domain resource 0 belongs to the first frequency domain unit in the frequency domain unit group 1). In an indication of the L1 bitmap, a value of a bit of the frequency domain unit is 0 (the second value). The frequency domain resource 0 corresponds to the first frequency domain unit in the frequency domain unit group 2 counted from left to right (or it may be considered that the frequency domain resource 0 belongs to the first frequency domain unit in the frequency domain unit group 2). In an indication of the L2 bitmap, a value of a bit of the frequency domain unit is 0 (the second value). In this case, a quantity of layers to be scheduled that are on the frequency domain resource 0 is the third value determined by the network device.

In an application scenario, a correspondence between a frequency domain resource and a frequency domain unit is pre-specified in a protocol. The first indication information is a bitmap, and a size of the first indication information when the first indication information is the bitmap is also pre-specified in the protocol. In addition, as specified in the protocol, the bitmap is divided into a plurality of orders of bits (for example, divided into a high-order bit and a low-order bit), and the first indication information is used to determine a quantity of layers to be scheduled corresponding to each of the plurality of orders of bits.

Figure 7E:
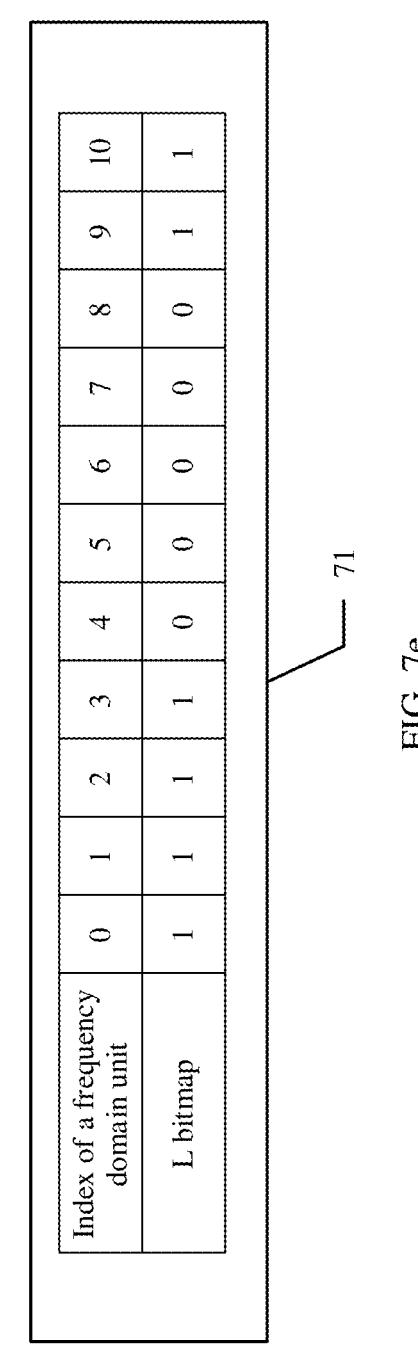
FIG. 7*e* is still another schematic diagram of determining a quantity of layers to be scheduled that are on a frequency domain resource according to embodiments.

For example, it may be specified in the protocol that the size of the first indication information (bitmap) is 11 bits (a bit 0 to a bit 10), where the first seven bits (the bit 0 to a bit 6) are high-order bits, and the last four bits (a bit 7 to the bit 10) are low-order bits. Each of the bits corresponds to one frequency domain unit. In other words, it may be understood as that there are 11 frequency domain units (a frequency domain unit 0 to a frequency domain unit 10). In the high-order bits, if a value of a bit is 1, it indicates that a quantity of layers to be scheduled that are in a frequency domain unit corresponding to the bit is one layer; and in the low-order bits, if a value of a bit is 1, it indicates that a quantity of layers to be scheduled that are in a frequency domain unit corresponding to the bit is two layers. In addition, a correspondence between 20 frequency domain resources (a frequency domain resource 0 to a frequency domain resource 19) and the 11 frequency domain units (the frequency domain unit 0 to the frequency domain unit 10) as shown in a module 70 in FIG. 7e may be further specified in the protocol. In other words, it may be understood as that, as specified in the protocol, each frequency domain unit in frequency domain units corresponding to a bit 0 to a bit 5 (that is, bits corresponding to the frequency domain unit 0 to a frequency domain unit 5 in FIG. 7e) includes three frequency domain resources; a frequency domain unit corresponding to a bit 6 (that is, a bit corresponding to a frequency domain unit 6 in FIG. 7e) includes two frequency domain resources; each frequency domain unit in frequency domain units corresponding to a bit 7 to a bit 9 (that is, bits corresponding to a frequency domain unit 7 to a frequency domain unit 9 in FIG. 7e) includes six frequency domain resources; and a frequency domain unit corresponding to a bit 10 (that is, a bit corresponding to a frequency domain unit 10 in FIG. 7e) includes two frequency domain resources.

In this application scenario, the first indication information is used to determine the quantity of layers to be scheduled corresponding to each of the plurality of orders of bits (for example, the orders of bits include a low-order bit and a high-order bit). For example, for a manner in which the first indication information is used to determine the quantity of layers to be scheduled corresponding to each of the plurality of orders of bits, refer to the manner in which the first indication information is used to determine the quantity of layers to be scheduled corresponding to each of the plurality of frequency domain unit groups in Case 2 in S302. Details are not described again in embodiments.

For example, the size of the first indication information (bitmap) is 11 bits (a bit 0 to a bit 10), where the first seven bits (the bit 0 to a bit 6) are high-order bits, and the last four bits (a bit 7 to the bit 10) are low-order bits. In the high-order bits, if a value of a bit is 1, it indicates that a quantity of layers to be scheduled that are in a frequency domain unit corresponding to the bit is one layer; and in the low-order bits, if a value of a bit is 1, it indicates that a quantity of layers to be scheduled that are in a frequency domain unit corresponding to the bit is two layers. The first indication information is shown in a module 71 in FIG. 7e. In this case, if the frequency domain resources for data transmission are the frequency domain resource 0 to a frequency domain resource 2, for brevity, a manner of determining a quantity of layers to be scheduled that are on the frequency domain resource 0 is used as an example for description. As shown in the module 70 in FIG. 7e, the frequency domain resource 0 belongs to the frequency domain unit 0 (a value of a bit of the frequency domain unit 0 shown in the module 71 is 1), and the frequency domain resource 0 also belongs to the frequency domain unit 7 (a value of a bit of the frequency domain unit 7 shown in the module 71 is 0). In this case, the quantity of layers to be scheduled that are on the frequency domain resource 0 is a quantity of layers to be scheduled corresponding to the frequency domain unit 0 (the value of the bit of the frequency domain unit 0 is 1). As an order of the bit corresponding to the frequency domain unit 0 is a high-order bit (that the value of the bit is 1 indicates that a quantity of layers to be scheduled that are in the frequency domain unit corresponding to the bit is one layer), the quantity of layers to be scheduled that are on the frequency domain resource 0 is one layer.

It can be understood that, according to the resource scheduling method described in FIG. 3a, the terminal device may determine, based on the quantity of layers, indicated by the first indication information, to be scheduled that are in each frequency domain unit or the quantity of layers, indicated by the first indication information, to be scheduled that are in each frequency domain unit group, a quantity of layers to be scheduled that are on each frequency domain resource for data transmission. In other words, the terminal device can perform differentiated scheduling on each frequency domain resource based on the indication information, to improve flexibility of resource scheduling in a communication system.

Refer to FIG. 8. FIG. 8 is a schematic flowchart of another resource scheduling method according to an embodiment. As shown in FIG. 8, the resource scheduling method includes S801 to S803. The method shown in FIG. 8 may be performed by a terminal device, or may be performed by a chip in a terminal device. An example in which the method is performed by a terminal device is used in FIG. 8 for description. For example:

S801: A terminal device obtains first indication information.

S802: The terminal device determines, based on the first indication information, a quantity of layers to be scheduled that are on frequency domain resources used by the terminal device for data transmission, where at least two of the frequency domain resources for data transmission have different quantities of layers to be scheduled.

For specific implementations in S801 and S802, refer to the descriptions of the specific implementations in S301 and S302. Details are not described again in embodiments.

S803: The terminal device determines, based on the quantity of layers to be scheduled that are on the frequency domain resources for data transmission, a demodulation reference signal port in the frequency domain resources for data transmission. At least two of the frequency domain resources for data transmission have different demodulation reference signal ports.

This may be understood as that the demodulation reference signal port in the frequency domain resources for data transmission is related to the quantity of layers to be scheduled that are on the frequency domain resource, and the demodulation reference signal port is a DMRS port.

In a possible implementation, for each frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

For example, the frequency domain resource used by the terminal device for data transmission and the quantity of layers to be scheduled that are on each frequency domain resource are shown in FIG. 7c. The frequency domain resource 3 to the frequency domain resource 5 each have two layers to be scheduled, the frequency domain resource 9 to the frequency domain resource 11 each have three layers to be scheduled, and the frequency domain resource 12 to the frequency domain resource 14 each have one layer to be scheduled. If DMRS ports are sorted by values of identifiers of the DMRS ports, for example, with five DMRS ports in total, the DMRS ports are sorted by identifiers of the DMRS ports in ascending order as follows: a DMRS port 0, a DMRS port 1, a DMRS port 2, a DMRS port 3, and a DMRS port 4. In this case, it may be determined that DMRS ports in the frequency domain resource 3 to the frequency domain resource 5 are the first two ports (the DMRS port 0 and the DMRS port 1) or the last two ports (the DMRS port 3 and the DMRS port 4); it may be determined that DMRS ports in the frequency domain resource 9 to the frequency domain resource 11 are the first three ports (the DMRS port 0, the DMRS port 1, and the DMRS port 2) or the last three ports (the DMRS port 2, the DMRS port 3, and the DMRS port 4); and it may be determined that DMRS ports in the frequency domain resource 12 to the frequency domain resource 14 are the first port (the DMRS port 0) or the last port (the DMRS port 4).

In another possible implementation, the terminal device receives second indication information, where the second indication information includes an index value that is in a demodulation reference signal port table and that corresponds to the frequency domain resources for data transmission. Each index value in the demodulation reference signal port table corresponds to a plurality of (two or more) quantities of demodulation reference signal ports. In this case, for each frequency domain resource for data transmission, a demodulation reference signal port in the frequency domain resource is a first demodulation reference signal port, where a quantity of first demodulation reference signal ports corresponds to the index value in the second indication information, and the quantity of first demodulation reference signal ports is the same as a quantity of layers to be scheduled that are on the frequency domain resource.

For example, the demodulation reference signal port table (also referred to as a demodulation reference signal port configuration table) is shown in Table 3. Each index value in Table 3 corresponds to a plurality of quantities of DMRS ports. For example, an index value 0 corresponds to two quantities of DMRS ports, that is, the DMRS port 0 to the DMRS port 1 (that is, the first two DMRS ports) and the DMRS port 0 to the DMRS port 2 (that is, the first three DMRS ports).

TABLE 3

| Index value | DMRS port |
| --- | --- |
| 0 | 0 and 1; and 0 to 2 |
| ... | ... |
| M | 0 to 2; and 0 to 3 |
| M + 1 | 1; and 0 and 1 |

If the terminal device receives the second indication information, the second indication information includes an index value M corresponding to the frequency domain resource for data transmission in Table 3. In addition, the terminal device determines, based on the first indication information, that a quantity of layers to be scheduled that are on a frequency domain resource 1 for data transmission is four layers, and that a quantity of layers to be scheduled that are on a frequency domain resource 2 for data transmission is three layers. It can be understood from Table 3 that the index value M corresponds to two quantities of DMRS ports in Table 1. In this case, the terminal device determines that a quantity of DMRS ports in the frequency domain resource 1 is 4, that is, determines that DMRS ports in the frequency domain resource 1 are the DRMS port 0 to the DMRS port 3 (the first four DMRS ports); and determines that a quantity of DMRS ports in the frequency domain resource 2 is 3, that is, determines that DMRS ports in the frequency domain resource 2 are the DMRS port 0 to the DMRS port 2 (the first three DMRS ports).

According to the resource scheduling method shown in FIG. 8, after flexibly configuring the quantity of layers to be scheduled that are on the frequency domain resources for data transmission, the terminal device determines a DMRS port in each frequency domain resource based on the quantity of layers to be scheduled that are on each frequency domain resource, so that the terminal device can obtain the DMRS port corresponding to each frequency domain resource to perform channel estimation.

Before the terminal device receives the first indication information to determine a quantity of layers to be scheduled corresponding to each frequency domain unit or a quantity of layers to be scheduled corresponding to each of a plurality of frequency domain unit groups, the terminal device may negotiate with a network device to determine a correspondence between a frequency domain resource in an active band and each frequency domain unit, or a correspondence between a frequency domain resource in an active band and each frequency domain unit in the plurality of frequency domain unit groups. Alternatively, the terminal device may determine, according to a specification in a communication protocol, a correspondence between a frequency domain resource in an active band and each frequency domain unit, or a correspondence between a frequency domain resource in an active band and each frequency domain unit in the plurality of frequency domain unit groups. Alternatively, the terminal device may determine the correspondence by directly obtaining the correspondence from the specification in the communication protocol. The active band is an activated bandwidth part (BWP). The activated BWP is also referred to as an active band or a scheduled bandwidth. A BWP may be a downlink bandwidth only for transmitting downlink data, an uplink bandwidth only for transmitting uplink data, or an overall uplink and downlink bandwidth for transmitting both uplink data and downlink data.

Specific manners in which the terminal device determines the correspondence between the frequency domain resource in the active band and each frequency domain unit or the correspondence between the frequency domain resource in the active band and each frequency domain unit in the plurality of frequency domain unit groups may be classified into the following three cases.

Case 1

Refer to FIG. 9a. FIG. 9a is a schematic flowchart of a method in which a terminal device divides a frequency domain resource in an active band.

S901: A terminal device determines third indication information.

The third indication information indicates a correspondence between a frequency domain resource in a reporting band and each frequency domain unit in a plurality of frequency domain units, or a correspondence between a frequency domain resource in a reporting band and each frequency domain unit in one or more frequency domain unit groups.

The reporting band may be a band configured by a network device in higher layer signaling (for example, a radio resource control (RRC) message) based on a length of a field of an information element (IE), a reporting band (csi-ReportingBand), in a CSI reporting configuration (CSI-ReportConfig). The information element csi-ReportingBand may indicate one group of continuous or discontinuous subbands, in a BWP, that needs to be reported to CSI. The information element csi-ReportingBand may be, for example, a bitmap. Each bit may correspond to one subband in the reporting band. Therefore, a length of the bitmap may represent a quantity of subbands included in the reporting band. Each bit in the bitmap may indicate whether a corresponding subband needs to be reported to the CSI. For example, when an indication bit is set to "1", a corresponding subband needs to be reported to the CSI; or when an indication bit is set to "0", no corresponding subband needs to be reported to the CSI. It should be understood that a meaning represented by a value of the indication bit herein is merely an example, and should not constitute any limitation on embodiments. In a possible implementation, the reporting band may be a BWP. For example, a length of a bitmap indicating the reporting band may be the same as a quantity of subbands included in the BWP.

This may be understood as that the terminal device determines the reporting band based on indication information of the network device. For example, a frequency domain resource in an active band includes a frequency domain resource 0 to a frequency domain resource 7. The network device sends the indication information to the terminal device by using RRC signaling. The indication information indicates that the frequency domain resource in the reporting band includes the frequency domain resource 0 to a frequency domain resource 3. Further, the terminal device may determine the correspondence between the frequency domain resource in the reporting band and each frequency domain unit, or the correspondence between the frequency domain resource in the reporting band and each frequency domain unit in the one or more frequency domain unit groups.

It should be noted that, for brevity of description, in all examples of embodiments, a case in which a length of the reporting band is the same as a length of the active band is described as an example, and should not be considered as a limitation on the scope of embodiments.

In a possible implementation, the terminal device performs channel measurement, divides the frequency domain resource in the reporting band into a plurality of frequency domain units based on a frequency domain correlation of a channel, and determines the correspondence between the frequency domain resource in the reporting band and each frequency domain unit. For example, the frequency domain resource in the reporting band includes the frequency domain resource 0 to the frequency domain resource 7. A result of the correlation, between frequency domain resources in the reporting band, measured by the terminal device is as follows: The frequency domain resource 0 and a frequency domain resource 1 are in a first coherent band, each frequency domain resource in a frequency domain resource 2 to a frequency domain resource 5 is in a second coherent band, and each frequency domain resource in a frequency domain resource 6 and the frequency domain resource 7 is in a third coherent band. In this case, the terminal device determines the correspondence between each frequency domain unit and the frequency domain resource, as shown in FIG. 9*b*. The frequency domain resource 0 and the frequency domain resource 1 correspond to a frequency domain unit 0, the frequency domain resource 2 to the frequency domain resource 5 correspond to a frequency domain unit 1, and the frequency domain resource 6 and the frequency domain resource 7 correspond to a frequency domain unit 2.

In another possible implementation, as the correlation between the frequency domain resources is relative, the correlation between the frequency domain resources in the reporting band may be classified into a plurality of degrees of correlation. The terminal device may measure a degree of correlation between the frequency domain resources in the reporting band, and determine a plurality of frequency domain unit groups based on the degree of correlation between the frequency domain resources in the reporting band. For example, when the correlation between the frequency domain resources is greater than a first value (for example, 80%), it may be considered that a degree of correlation between the frequency domain resources is high. It is assumed that the frequency domain resource in the reporting band includes the frequency domain resource 0 to the frequency domain resource 7. A result of the correlation, between the frequency domain resources in the reporting band, measured by the terminal device is as follows:

(1) The frequency domain resource 0 to the frequency domain resource 5 are in a first coherent band, where a correlation between the frequency domain resource 0 and the frequency domain resource 1 is 90% (greater than 80%, which may be approximately considered as a high degree of correlation), and a degree of correlation between frequency domain resources in the frequency domain resource 2 to the frequency domain resource 5 is 85% (greater than 80%, which may be approximately considered as a high degree of correlation). However, a degree of correlation between the frequency domain resource 0 (or the frequency domain resource 1) and any frequency domain resource in the frequency domain resource 2 to the frequency domain resource 5 is 60% (less than 80%, which may be approximately considered as a low degree of correlation).

(2) The frequency domain resource 6 and the frequency domain resource 7 are in a second coherent band, and a degree of correlation between the frequency domain resource 6 and the frequency domain resource 7 is 82% (greater than 80%, which may be approximately considered as a high degree of correlation).

In this case, the terminal device determines the correspondence between each frequency domain unit and the frequency domain resource in the reporting band, as shown in FIG. 9*c*. The frequency domain resource in the reporting band corresponds to two frequency domain unit groups. In a frequency domain unit group 1, a degree of correlation between frequency domain resources of a same frequency domain unit is high. In the frequency domain unit group 1, a frequency domain unit 10 corresponds to a frequency domain resource 0 and a frequency domain resource 1, a frequency domain unit 11 corresponds to a frequency domain resource 2 to a frequency domain resource 5, and a frequency domain unit 12 corresponds to a frequency domain resource 6 and a frequency domain resource 7. In a frequency domain unit group 2, frequency domain resources of a same frequency domain unit are in one coherent band, but a degree of correlation between the frequency domain resources is low. In the frequency domain unit group 2, a frequency domain unit 20 corresponds to the frequency domain resource 0 to the frequency domain resource 5, and a frequency domain unit 21 corresponds to the frequency domain resource 6 and the frequency domain resource 7.

In still another possible implementation, the terminal device performs channel measurement, and determines, based on a frequency domain correlation of a channel, a quantity of frequency domain resources corresponding to each frequency domain unit, or a quantity of frequency domain resources corresponding to each frequency domain unit in each frequency domain unit group. In this way, it may be understood as that the third indication information indicates the correspondence between the frequency domain resource in the reporting band and each frequency domain unit, or indicates the correspondence between the frequency domain resource in the reporting band and each frequency domain unit in the plurality of frequency domain unit groups. It should be noted that when the network device determines, based on the quantity of frequency domain resources corresponding to each frequency domain unit or the quantity of frequency domain resources corresponding to each frequency domain unit in each frequency domain unit group determined by the terminal device, a frequency domain unit corresponding to a frequency domain resource in the active band, a quantity of in the active band is allowed to be less than the quantity, determined by the terminal device, of frequency domain resources corresponding to each frequency domain unit. For example, it may be understood as that for the network device, a quantity of frequency domain units corresponding to the frequency domain resource in the active band is Q, as shown in Formula (1).

$$N \div X = ZL\ a,\ \ 0 \le a < X \qquad (1)$$

$$Q = \begin{cases} Z & a = 0 \\ Z + 1 & 0 < a < X \end{cases}$$

N is a quantity of frequency domain resources in the active band, X is the quantity, determined by the terminal device, of frequency domain resources corresponding to each frequency domain unit, Z is an integer, and a is a remainder, where a is greater than or equal to 0, and a is less than X. For example, it may be understood as that when N is not divisible by X, the quantity Q of frequency domain units is equal to Z+1; or when N is divisible by X, the quantity Q of frequency domain units is equal to Z.

In a possible implementation, the third indication information further includes a quantity of layers to be scheduled corresponding to each frequency domain unit, or a quantity of layers to be scheduled corresponding to each of a plurality of frequency domain unit groups. In this possible implementation, the third indication information is used by the network device to determine the first indication information described above.

According to the method in which the terminal device determines a correspondence between a frequency domain resource in the active band and each frequency domain unit in S901, the terminal device determines the correspondence between the frequency domain resource and the frequency domain unit based on a frequency domain correlation of a channel. In other words, it may be understood as that the correspondence between the frequency domain resource and the frequency domain unit is adaptive to a frequency selection characteristic of the channel.

S902: The terminal device sends the third indication information to the network device.

The third indication information indicates the correspondence between the frequency domain resource in the reporting band and each frequency domain unit in the plurality of frequency domain units, or the correspondence between the frequency domain resource in the reporting band and each frequency domain unit in the one or more frequency domain unit groups. The terminal device sends the third indication information to the network device, so that the network device further synchronously determines, based on the third indication information, the correspondence between the frequency domain resource in the active band and each frequency domain unit, or a correspondence between the frequency domain resource in the active band and each frequency domain unit in the one or more frequency domain unit groups.

For example, the third indication information sent by the terminal device and received by the network device is shown in Table 4. The third indication information indicates a correspondence between the frequency domain resource 0 to the frequency domain resource 7 in the reporting band and each frequency domain unit, and the quantity of layers to be scheduled corresponding to each frequency domain unit.

TABLE 4

| Frequency domain resource | Frequency domain unit | Quantity of layers to be scheduled |
|---|---|---|
| Frequency domain resource 0 and frequency domain resource 1 | Frequency domain unit 0 | 1 layer |
| Frequency domain resource 2 to frequency domain resource 5 | Frequency domain unit 1 | 2 layers |
| Frequency domain resource 6 and frequency domain resource 7 | Frequency domain unit 2 | 1 layer |

Further, in a possible case, the network device may synchronously determine, based on content of the third indication information, frequency domain units corresponding to the frequency domain resource 0 to the frequency domain resource 7 in the active band and the quantity of layers to be scheduled corresponding to each frequency domain unit. In addition, the network device sends the first indication information to the terminal device, where content of the first indication information is shown in Table 4. In other words, in this case, the first indication information may be considered as a piece of notification acknowledgment information, and is used to notify the terminal device to allow subsequently determining, based on the correspondence, determined based on the third indication information, between the frequency domain resource in the reporting band and the frequency domain unit and the quantity of layers to be scheduled corresponding to each frequency domain unit, a quantity of layers to be scheduled that are on a frequency domain resource, for data transmission, in the active band.

In another possible case, the network device uses the third indication information only as reference information for determining the first indication information. In this possible case, after receiving the third indication information, the network device adjusts, based on one or more network transmission performance parameters (including, but not limited to, a system throughput, a system latency, a transmission rate, or user experience level), a correspondence, indicated in the third indication information, between some (or all) frequency domain resources and a frequency domain unit, or a quantity, in the third indication information, of layers to be scheduled corresponding to some (or all) frequency domain units. For example, the third indication information is shown in Table 4. The network device may determine the first indication information based on the third indication information, as shown in Table 5, and adjust a quantity of layers, one layer in the third indication information, to be scheduled corresponding to the frequency domain unit 0 to a quantity of layers, two layers, to be scheduled corresponding to the frequency domain unit 0.

TABLE 5

| Frequency domain resource | Frequency domain unit | Quantity of layers to be scheduled |
| --- | --- | --- |
| Frequency domain resource 0 and frequency domain resource 1 | Frequency domain unit 0 | 2 layers |
| Frequency domain resource 2 and frequency domain resource 5 | Frequency domain unit 1 | 2 layers |
| Frequency domain resource 6 and frequency domain resource 7 | Frequency domain unit 2 | 1 layer |

In conclusion, the correspondence, in the first indication information, between the frequency domain resource in the active band and each frequency domain unit may be the same as or different from the correspondence, in the third indication information, between the frequency domain resource in the reporting band and each frequency domain unit. Alternatively, the correspondence, in the first indication information, between the frequency domain resource in the active band and each frequency domain unit in the plurality of frequency domain unit groups may be the same as or different from the correspondence, in the third indication information, between the frequency domain resource in the reporting band and each frequency domain unit in the plurality of frequency domain unit groups. In addition, the quantity, in the first indication information, of layers to be scheduled corresponding to each frequency domain unit may be different from the quantity, in the third indication information, of layers to be scheduled corresponding to each frequency domain unit; or the quantity, in the first indication information, of layers to be scheduled corresponding to the plurality of frequency domain unit groups may be different from the quantity, in the third indication information, of layers to be scheduled corresponding to the plurality of frequency domain unit groups. It may be understood as that the quantity of layers to be scheduled corresponding to the frequency domain unit and the quantity of layers to be scheduled corresponding to the plurality of frequency domain unit groups are finally determined by the network device.

Case 2

Refer to FIG. 10. FIG. 10 is a schematic flowchart of another method in which a terminal device divides a frequency domain resource in an active band.

S1001: A network device determines fourth indication information.

The fourth indication information indicates a correspondence between a frequency domain resource in an active band and each frequency domain unit in a plurality of frequency domain units, or a correspondence between a frequency domain resource in an active band and each frequency domain unit in a plurality of frequency domain unit groups.

In a possible implementation, the network device determines the correspondence between the frequency domain resource and each frequency domain unit based on a correlation between frequency domain resources in the active band. For example, the frequency domain resource in the active band includes a frequency domain resource 0 to a frequency domain resource 7. A result of the correlation between the frequency domain resources in the active band is as follows: The frequency domain resource 0 and a frequency domain resource 1 are in a first coherent band, a frequency domain resource 2 to a frequency domain resource 5 are in a second coherent band, and a frequency domain resource 6 and the frequency domain resource 7 are in a third coherent band. In this case, the network device determines the correspondence between each frequency domain unit and the frequency domain resource, as shown in FIG. 9*b*. The frequency domain resource 0 and the frequency domain resource 1 correspond to a frequency domain unit 0, the frequency domain resource 2 to the frequency domain resource 5 correspond to a frequency domain unit 1, and the frequency domain resource 6 and the frequency domain resource 7 correspond to a frequency domain unit 2.

In another possible implementation, as the correlation between the frequency domain resources is relative, the correlation between the frequency domain resources in the active band may be classified into a plurality of degrees of correlation. The network device determines a degree of correlation between the frequency domain resources in the active band, and determines a plurality of frequency domain unit groups based on the degree of correlation between the frequency domain resources in the active band. For example, when the correlation between the frequency domain resources is greater than a first value (for example, 80%), it may be considered that a degree of correlation between the frequency domain resources is high. It is assumed that the frequency domain resource in the active band includes the frequency domain resource 0 to the frequency domain resource 7. A result of the correlation, between the frequency domain resources in the active band, determined by the network device is as follows:

(1) The frequency domain resource 0 to the frequency domain resource 5 are in a first coherent band, where a correlation between the frequency domain resource 0 and the frequency domain resource 1 is 90% (greater than 80%, which may be approximately considered as a high degree of correlation), and a degree of correlation between frequency domain resources in the frequency domain resource 2 to the frequency domain resource 5 is 85% (greater than 80%, which may be approximately considered as a high degree of correlation). However, a degree of correlation between the frequency domain resource 0 (or the frequency domain resource 1) and any frequency domain resource in the frequency domain resource 2 to the frequency domain resource 5 is 60% (less than 80%, which may be approximately considered as a low degree of correlation).

(2) The frequency domain resource 6 and the frequency domain resource 7 are in a second coherent band, and a degree of correlation between the frequency domain resource 6 and the frequency domain resource 7 is 82% (greater than 80%, which may be approximately considered as a high degree of correlation).

In this case, the network device determines the correspondence between each frequency domain unit and the frequency domain resource, as shown in FIG. 9*c*. The frequency domain resource in the active band corresponds to two frequency domain unit groups. In a frequency domain unit group 1, a degree of correlation between frequency domain resources of a same frequency domain unit is high. In the frequency domain unit group 1, a frequency domain unit 10 corresponds to a frequency domain resource 0 and a frequency domain resource 1, a frequency domain unit 11 corresponds to a frequency domain resource 2 to a frequency domain resource 5, and a frequency domain unit 12 corresponds to a frequency domain resource 6 and a frequency domain resource 7. In a frequency domain unit group 2, frequency domain resources of a same frequency domain unit are in one coherent band, but a degree of correlation between the frequency domain resources is low. In the frequency domain unit group 2, a frequency domain unit 20 corresponds to the frequency domain resource 0 to the frequency domain resource 5, and a frequency domain unit 21 corresponds to the frequency domain resource 6 and the frequency domain resource 7.

In still another possible implementation, the network device performs channel measurement, and determines, based on a frequency domain correlation of a channel, a quantity of frequency domain resources corresponding to each frequency domain unit, or a quantity of frequency domain resources corresponding to each frequency domain unit in each frequency domain unit group. In this way, it may be understood as that the fourth indication information indicates the correspondence between the frequency domain resource in the active band and each frequency domain unit, or indicates the correspondence between the frequency domain resource in the active band and each frequency domain unit in the plurality of frequency domain unit groups. It should be noted that when the terminal device determines, based on the quantity of frequency domain resources corresponding to each frequency domain unit or the quantity of frequency domain resources corresponding to each frequency domain unit in each frequency domain unit group determined by the network device, a frequency domain unit corresponding to a frequency domain resource in the active band, a quantity of frequency domain resources in the last frequency domain unit in the active band is allowed to be less than the quantity, determined by the network device, of frequency domain resources corresponding to each frequency domain unit. For example, it may be understood as that for the terminal device, a quantity of frequency domain units corresponding to the frequency domain resource in the active band is Q, as shown in Formula (2).

$$N \div X = ZL \ a, \quad 0 \le a < X \qquad (2)$$

$$Q = \begin{cases} Z & a = 0 \\ Z + 1 & 0 < a < X \end{cases}$$

N is a quantity of frequency domain resources in the reporting band, X is the quantity, determined by the network device, of frequency domain resources corresponding to each frequency domain unit, Z is an integer, and a is a remainder, where a is greater than or equal to 0, and a is less than X. For example, it may be understood as that when N is not divisible by X, the quantity Q of frequency domain units is equal to Z+1; or when N is divisible by X, the quantity Q of frequency domain units is equal to Z.

S1002: The terminal device receives the fourth indication information sent by the network device.

The terminal device receives the fourth indication information sent by the network device, and determines, based on the fourth indication information, the correspondence between the frequency domain resource in the active band and each frequency domain unit, or the correspondence between the frequency domain resource in the active band and each frequency domain unit in the plurality of frequency domain unit groups.

For example, the terminal device determines the relationship between the frequency domain resource and the frequency domain unit based on an index of the frequency domain resource in the active band and the fourth indication information.

According to the method in which the network device determines a correspondence between a frequency domain resource in the active band and each frequency domain unit in FIG. 10, the network device determines the correspondence between the frequency domain resource and the frequency domain unit based on a frequency domain correlation of a channel. In other words, it may be understood as that the correspondence between the frequency domain resource and the frequency domain unit is adaptive to a frequency selection characteristic of the channel. Because the network device may further flexibly configure a quantity of layers to be scheduled that are on each frequency domain resource based on an actual application scenario, and perform differentiated configuration on the quantity of layers to be scheduled that are on each frequency domain resource, to avoid a waste of frequency domain resources, spectrum utilization is improved.

Case 3

A terminal device determines, according to a specification in a communication protocol between a network device and the terminal device, a correspondence between a frequency domain resource in an active band and each frequency domain unit in a plurality of frequency domain units, or a correspondence between a frequency domain resource in an active band and each frequency domain unit in one or more frequency domain unit groups. Alternatively, the terminal device may determine the correspondence by directly obtaining the correspondence from the specification in the communication protocol. The network device also determines, according to the specification in the communication protocol between the network device and the terminal device, the correspondence between the frequency domain resource in the active band and each frequency domain unit, or the correspondence between the frequency domain resource in the active band and each frequency domain unit in the one or more frequency domain unit groups. Alternatively, the network device may determine the correspondence by directly obtaining the correspondence from the specification in the communication protocol.

In a possible implementation, a quantity of frequency domain resources corresponding to each frequency domain unit is pre-specified in the communication protocol between the network device and the terminal device, so that both the terminal device and the network device may determine the correspondence between the frequency domain resource in the active band and each frequency domain unit based on the quantity of frequency domain resources corresponding to each frequency domain unit. It should be noted that a quantity of frequency domain resources in the last frequency domain unit corresponding to the frequency domain resource in the band is allowed to be less than the quantity, pre-specified in the communication protocol, of frequency domain resources corresponding to each frequency domain unit. For example, it may be understood as that a quantity of frequency domain units corresponding to the frequency domain resource in the active band is Q shown in Formula (2) above, or a quantity of frequency domain units corresponding to the frequency domain resource in the active band is Q shown in Formula (1) above.

For example, an example in which the terminal device determines the correspondence between the frequency domain resource in the active band and the frequency domain unit is used for description. It is pre-specified in the communication protocol that a quantity of frequency domain resources corresponding to each frequency domain unit is 3, and the frequency domain resource in the active band includes a frequency domain resource 0 to a frequency domain resource 19. In this case, as shown in FIG. 4, the terminal device determines that every three frequency domain resources in the active band form one frequency domain unit. Because there are 20, not divisible by 3, frequency domain resources in the active band, a quantity of frequency domain resources in the last frequency domain unit (that is, a frequency domain unit 6 in FIG. 4) corresponding to the frequency domain resource in the band is 2, and is less than the quantity, 3, pre-specified in the communication protocol, of frequency domain resources corresponding to each frequency domain unit, and a quantity P of frequency domain units corresponding to the frequency domain resource in the active band is 7.

In another possible implementation, when it is pre-specified in the communication protocol that there are a plurality of frequency domain unit groups, a quantity of frequency domain resources corresponding to each frequency domain unit in each frequency domain unit group is further pre-specified in the communication protocol. The terminal device or the network device determines the correspondence between the frequency domain resource in the active band and each frequency domain unit in each frequency domain unit group based on the quantity of frequency domain resources corresponding to each frequency domain unit in each frequency domain unit group. It should be noted that a quantity of frequency domain resources in the last frequency domain unit in each frequency domain unit group corresponding to the frequency domain resource in the active band is allowed to be less than the quantity, pre-specified in the communication protocol, of frequency domain resources corresponding to each frequency domain unit in each frequency domain unit group. For example, it is pre-specified in the communication protocol that there are two frequency domain unit groups, a quantity of frequency domain resources corresponding to each frequency domain unit in a frequency domain unit group 1 is 3, a quantity of frequency domain resources corresponding to each frequency domain unit in a frequency domain unit group 2 is 6, and the frequency domain resource in the active band includes a frequency domain resource 0 to a frequency domain resource 19. In this case, as shown in FIG. 5, the terminal device determines that every three frequency domain resources in the active band form the frequency domain unit in the frequency domain unit group 1, and determines that every six frequency domain resources in the active band form the frequency domain unit in the frequency domain unit group 2. Because there are 20, not divisible by 3 or 6, frequency domain resources in the active band, a quantity of frequency domain resources in the last frequency domain unit (that is, a frequency domain unit 16 in FIG. 5) in the frequency domain unit group 1 corresponding to the frequency domain resource in the active band is 2, and is less than the quantity, 3, pre-specified in the communication protocol, of frequency domain resources corresponding to each frequency domain unit in the frequency domain unit group 1; and quantity of frequency domain resources in the last frequency domain unit (such as a frequency domain unit 23 in FIG. 5) in the frequency domain unit group 2 corresponding to the frequency domain resource in the active band is 2, and is less than the quantity, 6, pre-specified in the communication protocol, of frequency domain resources corresponding to each frequency domain unit in the frequency domain unit group 2.

Refer to FIG. 11. FIG. 11 is a schematic flowchart of still another resource scheduling method according to an embodiment. As shown in FIG. 11, the resource scheduling method includes S1101 and S1102. The method shown in FIG. 11 may be performed by a terminal device, or may be performed by a chip in a terminal device. An example in which the method is performed by a terminal device is used in FIG. 11 for description. For example:

S1101: A terminal device determines third indication information.

The third indication information indicates a correspondence between a frequency domain resource in a reporting band and each frequency domain unit in a plurality of frequency domain units, and a quantity of layers to be scheduled corresponding to each frequency domain unit; or the third indication information indicates a correspondence between a frequency domain resource in a reporting band and each frequency domain unit in one or more frequency domain unit groups, and a quantity of layers to be scheduled corresponding to each frequency domain unit group in one or more frequency domain unit groups. The frequency domain unit group includes a plurality of frequency domain units, and frequency domain resources in a same frequency domain unit have a same quantity of layers to be scheduled.

For example, for a specific implementation in which the terminal device determines the third indication information in S1101, refer to related descriptions of a specific implementation in S901. Details are not described herein again.

Further, the terminal device sends the third indication information to a network device. The third indication information is used by the network device to determine a correspondence between a frequency domain resource in an active band and each frequency domain unit in the plurality of frequency domain units, and the quantity of layers to be scheduled that are in each frequency domain unit; or the third indication information is used by the network device to determine a correspondence between a frequency domain resource in an active band and each frequency domain unit in the one or more frequency domain unit groups, and the quantity of layers to be scheduled corresponding to each frequency domain unit group in the one or more frequency domain unit groups.

S1102: The terminal device determines, based on the third indication information, a quantity of layers to be scheduled that are on frequency domain resources for data transmission. At least two of the frequency domain resources for data transmission have different quantities of layers to be scheduled.

The terminal device receives RA information from the network device, and determines, based on the RA information, the frequency domain resource used by the terminal device for data transmission. Further, the terminal device determines, based on the third indication information, the quantity of layers to be scheduled that are on each frequency domain resource for data transmission.

That the terminal device determines the quantity of layers to be scheduled that are on the frequency domain resources for data transmission is described below in detail and classified into the following two cases.

Case 1: The third indication information indicates the correspondence between the frequency domain resource in the reporting band and each frequency domain unit in the plurality of frequency domain units, and the third indication information includes the quantity of layers to be scheduled corresponding to each frequency domain unit.

In a possible implementation, for each frequency domain resource, in the plurality of frequency domain units, in the frequency domain resources for data transmission, a quantity of layers to be scheduled that are on the frequency domain resource is a quantity of layers to be scheduled that is determined based on a bit corresponding to a first frequency domain unit. The first frequency domain unit is a frequency domain unit to which the frequency domain resource belongs. In other words, the terminal device determines a plurality of frequency domain resources for data transmission, and determines a frequency domain unit (that is, the first frequency domain unit) corresponding to each frequency domain resource in the plurality of frequency domain resources for data transmission. For each frequency domain resource for data transmission, the terminal device determines that a quantity of layers to be scheduled that is indicated by a bit corresponding to a first frequency domain unit corresponding to the frequency domain resource is a quantity of layers to be scheduled that are on the frequency domain resource.

For example, the resource allocation information is scheduling information in a type 0, that is, the resource allocation information is a bitmap (the bitmap is referred to as an RA bitmap). A bit in the RA bitmap is in a one-to-one correspondence with a frequency domain resource. When a value of the bit in the RA bitmap is 1, it is determined that a frequency domain resource corresponding to the bit is a frequency domain resource for data transmission. Refer to FIG. 7a. In FIG. 7a, the frequency domain resources for data transmission determined by the terminal device based on an indication of the RA bitmap include a frequency domain resource 3 to a frequency domain resource 5 and a frequency domain resource 9 to a frequency domain resource 14. The terminal device determines first frequency domain units corresponding to the frequency domain resources for data transmission, that is, a frequency domain unit 1 (a frequency domain unit corresponding to the frequency domain resource 3 to the frequency domain resource 5), a frequency domain unit 3 (a frequency domain unit corresponding to the frequency domain resource 9 to a frequency domain resource 11), and a frequency domain unit 4 (a frequency domain unit corresponding to a frequency domain resource 12 to the frequency domain resource 14). Further, the terminal device determines, based on the third indication information (an L bitmap in FIG. 7a), a quantity of layers to be scheduled that are in each first frequency domain unit. Values of bits corresponding to the frequency domain unit 1 and the frequency domain unit 4 each are 1, and quantities of layers to be scheduled that are in the frequency domain unit 1 and the frequency domain unit 4 each are P layers. A value of a bit corresponding to the frequency domain unit 3 is 0, and a quantity of layers to be scheduled that are in the frequency domain unit 3 is P–1 layers. A quantity of layers to be scheduled that are on each frequency domain resource for transmission determined by the terminal device is as follows: A quantity of layers to be scheduled that are on the frequency domain resource 3 to the frequency domain resource 5 (corresponding to the frequency domain unit 1) is P layers, a quantity of layers to be scheduled that are on the frequency domain resource 9 to the frequency domain resource 11 (corresponding to the frequency domain unit 3) is P–1 layers, and a quantity of layers to be scheduled that are on the frequency domain resource 12 to the frequency domain resource 14 (corresponding to the frequency domain unit 4) is P layers. The P layers may be understood as a maximum quantity of layers to be scheduled that are on the frequency domain resources used by the terminal device for data transmission.

In another example, the resource allocation information is scheduling information in the type 1, and the scheduling information indicates a start RB and a quantity of consecutively allocated RBs. Refer to FIG. 7b. In FIG. 7b, the scheduling information indicates that the start RB is an RB 3, and the quantity of consecutively allocated RBs is 12. In this case, the frequency domain resources for data transmission determined by the terminal device based on the scheduling information include the RB 3 to an RB 14. First frequency domain units, determined by the terminal device, corresponding to the frequency domain resources for data transmission is as follows: a frequency domain unit 1 (a frequency domain unit corresponding to the RB 3 to an RB 5), a frequency domain unit 2 (a frequency domain unit corresponding to an RB 6 to an RB 8), a frequency domain unit 3 (a frequency domain unit corresponding to an RB 9 to an RB 11), and a frequency domain unit 4 (a frequency domain unit corresponding to an RB 12 to the RB 14). Further, the terminal device determines, based on the first indication information (an L bitmap in FIG. 7b), a quantity of layers to be scheduled that are in each first frequency domain unit. Values of bits corresponding to the frequency domain unit 1, the frequency domain unit 2, and the frequency domain unit 4 each are 1, and quantities of layers to be scheduled that are in the frequency domain unit 1, the frequency domain unit 2, and the frequency domain unit 4 each are P layers. A value of a bit corresponding to the frequency domain unit 3 is 0, and a quantity of layers to be scheduled that are in the frequency domain unit 3 is P–1 layers. A quantity of layers to be scheduled that are on each frequency domain resource for transmission determined by the terminal device is as follows: A quantity of layers to be scheduled that are on the RB 3 to the RB 5 (corresponding to the frequency domain unit 1) is P layers, a quantity of layers to be scheduled that are on the RB 6 to the RB 8 (corresponding to the frequency domain unit 2) is P layers, a quantity of layers to be scheduled that are on the RB 9 to the RB 11 (corresponding to the frequency domain unit 3) is P–1 layers, and a quantity of layers to be scheduled that are on the RB 12 to the RB 14 (corresponding to the frequency domain unit 4) is P layers. The P layers may be understood as a maximum quantity of layers to be scheduled that are on the frequency domain resources used by the terminal device for data transmission.

In another possible implementation, the third indication information includes information about a quantity of layers to be scheduled corresponding to each frequency domain unit (for example, as shown in FIG. 6b). In this case, for each frequency domain resource in the frequency domain resources for data transmission, a quantity of layers to be scheduled that are on the frequency domain resource is obtained based on information about a quantity of layers to be scheduled corresponding to a first frequency domain unit. The first frequency domain unit is a frequency domain unit to which the frequency domain resource belongs. In other words, the terminal device determines a plurality of frequency domain resources for data transmission, and determines a frequency domain unit (that is, the first frequency domain unit) corresponding to each frequency domain resource in the plurality of frequency domain resources for data transmission. For each frequency domain resource for data transmission, the terminal device determines that a quantity of layers to be scheduled corresponding to the first frequency domain unit corresponding to the frequency domain resource is a quantity of layers to be scheduled that are on the frequency domain resource.

For example, refer to FIG. 7c. In FIG. 7c, the frequency domain resources for data transmission determined by the terminal device based on an indication of an RA bitmap include a frequency domain resource 3 to a frequency domain resource 5 and a frequency domain resource 9 to a frequency domain resource 14. The terminal device determines first frequency domain units corresponding to the frequency domain resources for data transmission, that is, a frequency domain unit 1 (a frequency domain unit corresponding to the frequency domain resource 3 to the frequency domain resource 5), a frequency domain unit 3 (a frequency domain unit corresponding to the frequency domain resource 9 to a frequency domain resource 11), and a frequency domain unit 4 (a frequency domain unit corresponding to a frequency domain resource 12 to the frequency domain resource 14). Further, the terminal device determines, based on the third indication information (a quantity of layers to be scheduled that are in each frequency domain unit, and a correspondence between each frequency domain unit and a frequency domain resource that are indicated in FIG. 7c), a quantity of layers to be scheduled that are in each first frequency domain unit. If a quantity of layers to be scheduled that are in the frequency domain unit 1 is two layers, a quantity of layers to be scheduled that are on the frequency domain resource 3 to the frequency domain resource 5 corresponding to the frequency domain unit 1 is two layers. If a quantity of layers to be scheduled that are in the frequency domain unit 3 is three layers, a quantity of layers to be scheduled that are on the frequency domain resource 9 to the frequency domain resource 11 corresponding to the frequency domain unit 3 is three layers. If a quantity of layers to be scheduled that are in the frequency domain unit 4 is one layer, a quantity of layers to be scheduled that are on the frequency domain resource 12 to the frequency domain resource 14 corresponding to the frequency domain unit 4 is one layer.

Case 2: The third indication information indicates the correspondence between the frequency domain resource in the reporting band and each frequency domain unit in the one or more frequency domain unit groups, and the third indication information indicates the quantity of layers to be scheduled corresponding to each frequency domain unit group in the one or more frequency domain unit groups.

In a possible implementation, for each frequency domain resource in the frequency domain resources for data transmission, if a value of a bit of a frequency domain unit to which the frequency domain resource belongs in any one frequency domain unit group in the one or more frequency domain unit groups is the first value, a quantity of layers to be scheduled that are on the frequency domain resource is a quantity of layers to be scheduled that are in a first frequency domain unit. If a first frequency domain unit group and a second frequency domain unit group are any two of the one or more frequency domain unit groups, the first frequency domain unit is a frequency domain unit of which a value of a bit is the first value in a frequency domain unit to which the frequency domain resource belongs in the first frequency domain unit group and a frequency domain unit to which the frequency domain resource belongs in the second frequency domain unit group; or the first frequency domain unit is a frequency domain unit to which the frequency domain resource belongs in a frequency domain unit group with a largest or smallest identifier in the first frequency domain unit group and the second frequency domain unit group.

In other words, the terminal device determines a plurality of frequency domain resources for data transmission. Refer to FIG. 7d. FIG. 7d includes an index value of a frequency domain resource, an RA bitmap indicating resource allocation information, a bitmap whose length is L1 bits and that indicates a quantity of layers to be scheduled that are in the frequency domain unit group 1, and a bitmap whose length is L2 bits and that indicates a quantity of layers to be scheduled that are in the frequency domain unit group 2. In addition, as shown in Table 2, it is pre-specified in a protocol that the quantity of layers to be scheduled corresponding to the frequency domain unit group 1 is one layer, and the quantity of layers to be scheduled corresponding to the frequency domain unit group 2 is two layers. Based on an indication of the RA bitmap, the frequency domain resources for data transmission determined by the terminal device include a frequency domain resource 0, a frequency domain resource 3 to a frequency domain resource 5, and a frequency domain resource 9 to a frequency domain resource 14. Further, for each frequency domain resource in the plurality of frequency domain resources for data transmission, the terminal device determines a frequency domain unit, in each frequency domain unit group, corresponding to the frequency domain resource. Further, the terminal device determines, based on a quantity of layers to be scheduled that are in the frequency domain unit, in each frequency domain unit group, corresponding to the frequency domain resource, a quantity of layers to be scheduled that are on the frequency domain resource.

If the frequency domain resource corresponds to only one frequency domain unit of which a value of a bit is 1 (the first value) in these frequency domain units, the frequency domain unit of the value of the bit is 1 is a first frequency domain unit. The terminal device determines that a quantity of layers to be scheduled that are in a frequency domain unit group corresponding to the first frequency domain unit is the quantity of layers to be scheduled that are on the frequency domain resource.

For example, the frequency domain resource 3 and a frequency domain unit 12 in the frequency domain resources for data transmission in FIG. 7d are used as an example for description. The frequency domain resource 3 corresponds to the second frequency domain unit in the frequency domain unit group 1 counted from left to right (or it may be considered that the frequency domain resource 3 belongs to the second frequency domain unit in the frequency domain unit group 1). In an indication of the L1 bitmap, a value of a bit of the frequency domain unit is 1 (that is, the first value). The frequency domain resource 3 corresponds to the first frequency domain unit in the frequency domain unit group 2 counted from left to right (or it may be considered that the frequency domain resource 3 belongs to the first frequency domain unit in the frequency domain unit group 2). In an indication of the L2 bitmap, a value of a bit of the frequency domain unit is 0. Further, it may be determined that a first frequency domain unit is the second frequency domain unit, corresponding to the frequency domain resource 3, in the frequency domain unit group 1 counted from left to right, and it is determined that a quantity of layers to be scheduled (that is, the quantity, one layer, of layers to be scheduled that are in the frequency domain unit group 1) that are in the first frequency domain unit is a quantity of layers to be scheduled that are on the frequency domain resource 3. The frequency domain resource 12 corresponds to the fifth frequency domain unit in the frequency domain unit group 1 counted from left to right (or it may be considered that the frequency domain resource 3 belongs to the fifth frequency domain unit in the frequency domain unit group 1). In an indication of the L1 bitmap, a value of a bit of the frequency domain unit is 0. The frequency domain resource 12 corresponds to the third frequency domain unit in the frequency domain unit group 2 counted from left to right (or it may be considered that the frequency domain resource 12 belongs to the third frequency domain unit in the frequency domain unit group 2). In an indication of the L2 bitmap, a value of a bit of the frequency domain unit is 1 (that is, the first value). Further, it may be determined that a first frequency domain unit is the third frequency domain unit, corresponding to the frequency domain resource 12, in the frequency domain unit group 2 counted from left to right, and it is determined that a quantity of layers to be scheduled (that is, a quantity, two layers, of layers to be scheduled that are in the frequency domain unit group 2) that are in the first frequency domain unit is a quantity of layers to be scheduled that are on the frequency domain resource 12.

If the frequency domain resource corresponds to two or more frequency domain units of which values of bits are 1 (the first value) in these frequency domain units, the first frequency domain unit is the frequency domain unit to which the frequency domain resource belongs in the frequency domain unit group with the largest or smallest identifier in the first frequency domain unit group and the second frequency domain unit group. It should be noted that, in the plurality of frequency domain unit groups, identifiers of the frequency domain unit groups are sorted by quantities of layers to be scheduled corresponding to the frequency domain unit groups. For example, with a larger quantity of layers to be scheduled corresponding to a frequency domain unit group, an identifier of the frequency domain unit group is larger; or with a larger quantity of layers to be scheduled corresponding to a frequency domain unit group, an identifier of the frequency domain unit group is smaller. For example, in FIG. 7*d*, the quantity of layers (two layers) to be scheduled that are in the frequency domain unit group 2 is greater than the quantity of layers (one layer) to be scheduled that are in the frequency domain unit group 1, so that an identifier of the frequency domain unit group 2 is greater than an identifier of the frequency domain unit group 1. The first frequency domain unit group and the second frequency domain unit group are merely examples for description. A quantity of frequency domain unit groups, corresponding to a frequency domain resource, of which values of bits are 1 (the first value) is not limited to 2 in embodiments. For example, a frequency domain resource 0 to a frequency domain resource 19 correspond to three frequency domain unit groups, that is, a frequency domain unit group 1, a frequency domain unit group 2, and a frequency domain unit group 3. A value of a bit of a frequency domain unit 10 corresponding to the frequency domain resource 0 in the corresponding frequency domain unit group 1 is 1 (the first value), a value of a bit of a frequency domain unit 20 corresponding to the frequency domain resource 0 in the corresponding frequency domain unit group 2 is 1 (the first value), and a value of a bit of a frequency domain unit 30 corresponding to the frequency domain resource 0 in the corresponding frequency domain unit group 3 is 1 (the first value). Identifiers of the frequency domain unit groups are sorted in ascending order as follows: the frequency domain unit group 1, the frequency domain unit group 2, and the frequency domain unit group 3. In this case, a first frequency domain unit corresponding to the frequency domain resource 0 may be a frequency domain unit corresponding to the largest identifier of the frequency domain unit group (the frequency domain unit group 3), that is, the frequency domain unit 30; or a first frequency domain unit corresponding to the frequency domain resource 0 may be a frequency domain unit corresponding to the smallest identifier of the frequency domain unit group (the frequency domain unit group 1), that is, the frequency domain unit 10.

For example, a frequency domain resource 9 in the frequency domain resources for data transmission in FIG. 7*d* is used as an example for description. The frequency domain resource 9 corresponds to the fourth frequency domain unit in the frequency domain unit group 1 counted from left to right (or it may be considered that the frequency domain resource 9 belongs to the fourth frequency domain unit in the frequency domain unit group 1). In an indication of the L1 bitmap, a value of a bit of the frequency domain unit is 1 (the first value), and it is determined that the frequency domain unit group 1 is the first frequency domain unit group. The frequency domain resource 9 corresponds to the second frequency domain unit in the frequency domain unit group 2 counted from left to right (or it may be considered that the frequency domain resource 9 belongs to the second frequency domain unit in the frequency domain unit group 2). In an indication of the L2 bitmap, a value of a bit of the frequency domain unit is 1 (the first value), and it may be determined that the frequency domain unit group 2 is the second frequency domain unit group. Because the value of the bit of the frequency domain unit to which the frequency domain resource 9 belongs in the first frequency domain unit group is 1, the value of the bit of the frequency domain unit to which the frequency domain resource 9 belongs in the second frequency domain unit group is 1, and an identifier of the first frequency domain unit group is less than an identifier of the second frequency domain unit group (it may be understood as that a quantity of layers to be scheduled that are in the first frequency domain unit group is less than a quantity of layers to be scheduled that are in the second frequency domain unit group), it is determined that a first frequency domain unit is the second frequency domain unit, corresponding to the frequency domain resource 9, in the frequency domain unit group 2 counted from left to right, and a quantity of layers to be scheduled that are on the frequency domain resource 9 is a quantity of layers to be scheduled that are in the first frequency domain unit, that is, a quantity of layers (two layers) to be scheduled corresponding to the frequency domain unit group 2.

If the frequency domain resource corresponds to no frequency domain unit of which a value of a bit is 1 (the first value) in these frequency domain units, or if a value of a bit of a frequency domain unit to which the frequency domain resource belongs in each frequency domain unit group in the plurality of frequency domain unit groups is 0 (a second value), a quantity of layers to be scheduled that are on the frequency domain resource is a third value determined by a network device. It should be noted that the third value is a maximum quantity P of layers to be scheduled that is indicated by DCI sent by the network device to the terminal device and that is allowed for the terminal device to schedule a frequency domain resource.

For example, a frequency domain resource 0 in the frequency domain resources for data transmission in FIG. 7*d* is used as an example for description. The frequency domain resource 0 corresponds to the first frequency domain unit in the frequency domain unit group 1 counted from left to right (or it may be considered that the frequency domain resource 0 belongs to the first frequency domain unit in the frequency domain unit group 1). In an indication of the L1 bitmap, a value of a bit of the frequency domain unit is 0 (the second value). The frequency domain resource 0 corresponds to the first frequency domain unit in the frequency domain unit group 2 counted from left to right (or it may be considered that the frequency domain resource 0 belongs to the first frequency domain unit in the frequency domain unit group 2). In an indication of the L2 bitmap, a value of a bit of the frequency domain unit is 0 (the second value). In this case, a quantity of layers to be scheduled that are on the frequency domain resource 0 is the third value determined by the network device.

It can be understood that, according to the resource scheduling method described in FIG. 11, the terminal device determines the quantity of layers to be scheduled that are in each frequency domain unit or the quantity of layers to be scheduled that are in each frequency domain unit group. Further, the terminal device determines, based on the quantity of layers to be scheduled that are in each frequency domain unit or the quantity of layers to be scheduled that are in each frequency domain unit group, the quantity of layers to be scheduled that are on each frequency domain resource for data transmission. In this way, the terminal device can perform differentiated scheduling on each frequency domain resource, to improve flexibility of resource scheduling in a communication system. Because the terminal device measures a channel, and determines, based on an actual condition of the channel, the correspondence between the frequency domain resource in the reporting band and each frequency domain unit, or determines the correspondence between the frequency domain resource in the reporting band and each frequency domain unit in the plurality of frequency domain unit groups, accuracy of division of frequency domain units is improved, a waste of frequency domain resources is avoided, and spectrum utilization is improved. As a correspondence between a frequency domain resource and a frequency domain unit is determined based on a frequency domain correlation of a channel, it may be understood as that the correspondence between the frequency domain resource and the frequency domain unit adapts a frequency selection characteristic of the channel.

It should be noted that, in a specific implementation, some steps in the accompanying drawings may be selected for implementation, or a sequence of steps in a figure may be adjusted for implementation. This is not limited in embodiments. It should be understood that performing some steps in a figure or adjusting a sequence of steps for a specific implementation shall fall in the scope of embodiments.

Figure 12:
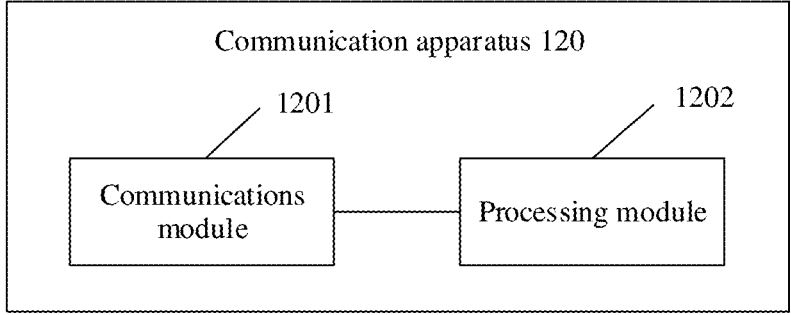
FIG. 12 is a schematic diagram of a structure of a communication apparatus according to embodiments.

Refer to FIG. 12. FIG. 12 is a schematic diagram of a structure of a communication apparatus 120 according to an embodiment. The communication apparatus shown in FIG. 12 may be configured to implement some or all functions of a terminal device in an embodiment corresponding to the foregoing resource scheduling method, or the communication apparatus shown in FIG. 12 may be configured to implement some or all functions of a network device in an embodiment corresponding to the foregoing resource scheduling method. The apparatus may be a terminal device, an apparatus in a terminal device, or an apparatus that can be used together with a terminal device. The apparatus may be a network device, an apparatus in a network device, or an apparatus that can be used together with a network device. The communication apparatus may alternatively be a chip system. The communication apparatus shown in FIG. 12 may include a communication module 1201 and a processing module 1202. For example:

In an embodiment, the communication apparatus 120 is a terminal device, an apparatus in a terminal device, or an apparatus that can be used together with a terminal device.

The communication module 1201 is configured to receive first indication information, where the first indication information is used to determine a quantity of layers to be scheduled corresponding to each frequency domain unit in a plurality of frequency domain units, or is used to determine a quantity of layers to be scheduled corresponding to each frequency domain unit group in one or more frequency domain unit groups, where one frequency domain unit group includes one or more frequency domain units, one frequency domain unit includes one or more frequency domain resources, and the one or more frequency domain resources in the frequency domain unit have a same quantity of layers to be scheduled; and the processing module 1202 is configured to determine, based on the first indication information, a quantity of layers to be scheduled that are on frequency domain resources used by the terminal device for data transmission, where at least two of the frequency domain resources for data transmission have different quantities of layers to be scheduled.

In a possible implementation, the first indication information includes a first bitmap, one bit in the first bitmap corresponds to one frequency domain unit, and the bit is used to determine a quantity of layers to be scheduled that are in the frequency domain unit corresponding to the bit.

In a possible implementation, for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit includes the frequency domain resource.

In a possible implementation, the first indication information includes a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

In a possible implementation, for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. The first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

In a possible implementation, the processing module 1202 is further configured to determine, based on the quantity of layers to be scheduled that are on the frequency domain resources for data transmission, a demodulation reference signal port in the frequency domain resources for data transmission, where demodulation reference signal ports in at least two of the frequency domain resources for data transmission are different.

In a possible implementation, the demodulation reference signal port is a DMRS port.

In a possible implementation, for one frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

In a possible implementation, the communication module 1201 is further configured to receive second indication information, where the second indication information includes an index value that is in a demodulation reference signal port table and that corresponds to the frequency domain resources for data transmission; each index value in the demodulation reference signal port table corresponds to a plurality of quantities of demodulation reference signal ports; and for one frequency domain resource for data transmission, a demodulation reference signal port in the frequency domain resource is a first demodulation reference signal port, where a quantity of first demodulation reference signal ports corresponds to the index value, and the quantity of first demodulation reference signal ports is the same as a quantity of layers to be scheduled that are on the frequency domain resource.

In a possible implementation, the processing module 1202 is further configured to determine third indication information, where the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups; and the communication module 1201 is further configured to send the third indication information to a network device.

In a possible implementation, the third indication information further includes the quantity of layers to be scheduled corresponding to each frequency domain unit in the plurality of frequency domain units, or the quantity of layers to be scheduled corresponding to each frequency domain unit group in the one or more frequency domain unit groups; and the third indication information is used by the network device to determine the first indication information.

In a possible implementation, the processing module 1202 is further configured to determine a correspondence between a frequency domain resource in a reporting band and each frequency domain unit in the plurality of frequency domain units, or a correspondence between a frequency domain resource in a reporting band and each frequency domain unit in the one or more frequency domain unit groups.

In a possible implementation, the processing module 1202 is configured to determine, based on a quantity of frequency domain resources corresponding to each frequency domain unit, the correspondence between the frequency domain resource in the reporting band and each frequency domain unit in the plurality of frequency domain units, where the quantity of frequency domain resources corresponding to the frequency domain unit is pre-specified in a protocol; or the processing module 1202 is configured to determine, based on a quantity of frequency domain resources corresponding to each frequency domain unit in each frequency domain unit group, the correspondence between each frequency domain unit in each frequency domain unit group in the one or more frequency domain unit groups and the frequency domain resource in the reporting band, where the quantity of frequency domain resources corresponding to each frequency domain unit in the frequency domain unit group is pre-specified in a protocol.

In a possible implementation, the communication module 1201 is configured to receive fourth indication information from a network device, where the fourth indication information indicates a correspondence between a frequency domain resource in an active band and each frequency domain unit in the plurality of frequency domain units, or the fourth indication information indicates a correspondence between a frequency domain resource in an active band and each frequency domain unit in the one or more frequency domain unit groups; and the processing module 1202 is configured to determine, based on the fourth indication information, the correspondence between the frequency domain resource in the active band and each frequency domain unit in the plurality of frequency domain units, or the correspondence between the frequency domain resource in the active band and each frequency domain unit in the one or more frequency domain unit groups.

It should be noted that, for a function of a functional unit in the communication apparatus 120 described in this embodiment, refer to related descriptions in the foregoing method embodiments in FIG. 3*a*, FIG. 8, and FIG. 11. Details are not described herein again.

In an embodiment, the communication apparatus 120 is a network device, an apparatus in a network device, or an apparatus that can be used together with a network device. The communication module 1201 is configured to send first indication information to a terminal device, where the first indication information is used to determine a quantity of layers to be scheduled corresponding to each frequency domain unit in a plurality of frequency domain units, or is used to determine a quantity of layers to be scheduled corresponding to each frequency domain unit group in one or more frequency domain unit groups, where one frequency domain unit group includes one or more frequency domain units, one frequency domain unit includes one or more frequency domain resources, and the one or more frequency domain resources in the frequency domain unit have a same quantity of layers to be scheduled.

In a possible implementation, the first indication information includes a first bitmap, one bit in the first bitmap corresponds to one frequency domain unit, and the bit is used to determine a quantity of layers to be scheduled that are in the frequency domain unit corresponding to the bit.

In a possible implementation, for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit includes the frequency domain resource.

In a possible implementation, the first indication information includes a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is used to determine that a quantity of layers to be scheduled corresponding to the frequency domain unit group is a quantity of layers to be scheduled that are in a frequency domain unit of which a value of a bit is a first value in the frequency domain unit group.

In a possible implementation, for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit. The first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

In a possible implementation, the communication module 1201 is configured to send second indication information, where the second indication information includes an index value that is in a demodulation reference signal port table and that corresponds to the frequency domain resources for data transmission; each index value in the demodulation reference signal port table corresponds to a plurality of quantities of demodulation reference signal ports; and for one frequency domain resource for data transmission, a demodulation reference signal port in the frequency domain resource is a first demodulation reference signal port, where a quantity of first demodulation reference signal ports corresponds to the index value, and the quantity of first demodulation reference signal ports is the same as a quantity of layers to be scheduled that are on the frequency domain resource.

In a possible implementation, the communication module 1201 is configured to receive third indication information from the terminal device, where the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups.

In a possible implementation, the third indication information further includes the quantity of layers to be scheduled corresponding to each frequency domain unit in the plurality of frequency domain units, or the quantity of layers to be scheduled corresponding to each frequency domain unit group in the one or more frequency domain unit groups; and the third indication information is used by the network device to determine the first indication information.

In a possible implementation, the processing module 1202 is configured to determine, based on a quantity of frequency domain resources corresponding to each frequency domain unit, the correspondence between the frequency domain resource in an active band and each frequency domain unit in the plurality of frequency domain units, where the quantity of frequency domain resources corresponding to the frequency domain unit is pre-specified in a protocol; or the processing module 1202 is configured to determine, based on a quantity of frequency domain resources corresponding to each frequency domain unit in each frequency domain unit group, the correspondence between each frequency domain unit in each frequency domain unit group in the one or more frequency domain unit groups and the frequency domain resource in an active band, where the quantity of frequency domain resources corresponding to each frequency domain unit in the frequency domain unit group is pre-specified in a protocol.

In a possible implementation, the communication module 1201 is configured to send fourth indication information to the terminal device, where the fourth indication information indicates the correspondence between the frequency domain resource in the active band and each frequency domain unit in the plurality of frequency domain units, or the fourth indication information indicates the correspondence between the frequency domain resource in the active band and each frequency domain unit in the one or more frequency domain unit groups.

Figure 13:
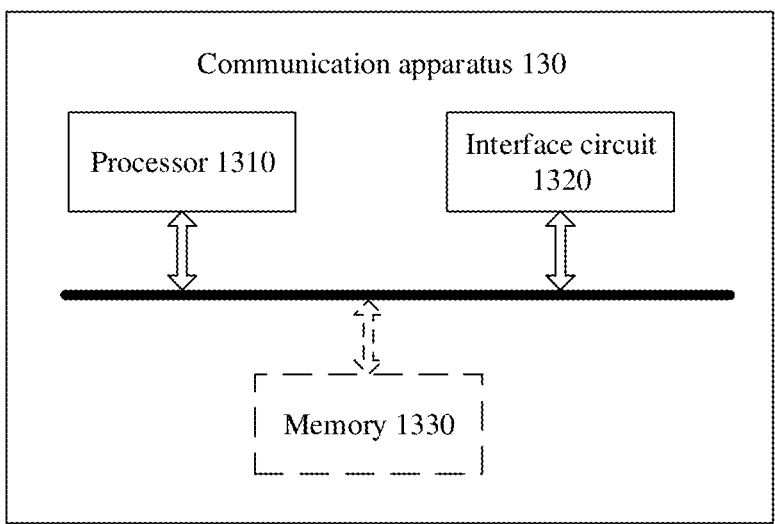
FIG. 13 is a schematic diagram of a structure of another communication apparatus according to embodiments.

Refer to FIG. 13. As shown in FIG. 13, a communication apparatus 130 includes a processor 1310 and an interface circuit 1320. The processor 1310 and the interface circuit 1320 are coupled to each other. It may be understood as that the interface circuit 1320 may be a transceiver or an input/output interface. Optionally, the communication apparatus 1300 may further include a memory 1330, configured to store instructions executed by the processor 1310, input data for the processor 1310 to run the instructions, or data generated after the processor 1310 runs the instructions.

When the communication apparatus 130 is configured to implement the method in the foregoing method embodiment, the processor 1310 is configured to perform a function of the foregoing processing module 1202, the interface circuit 1320 is configured to perform a function of the foregoing communication module 1201, and the memory 1330 stores the instructions executed by the processor 1310, the input data for the processor 1310 to run the instructions, or the data generated after the processor 1310 runs the instructions.

When the communication apparatus 130 is a chip used in a terminal device, the chip in the terminal device implements a function of a terminal device in the foregoing method embodiment. The chip in the terminal device receives information from another module (for example, a radio frequency module or an antenna) in the terminal device. The information is sent by an access network device to the terminal device. Alternatively, the chip in the terminal device sends information to another module (for example, a radio frequency module or an antenna) in the terminal device. The information is sent by the terminal device to an access network device.

When the communication apparatus 130 is a chip used in a network device, the chip in the network device implements a function of a network device in the foregoing method embodiment. The chip in the network device receives information from another module (for example, a radio frequency module or an antenna) in the network device. The information is sent by a terminal device to the network device.

Alternatively, the chip in the network device sends information to another module in the network device. The information is sent by the network device to a terminal device.

It may be understood that the processor in this embodiment may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

Steps in a method in embodiments may be implemented by hardware, or may be implemented by the processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to the processor, so that the processor can read information from the storage medium and write information into the storage medium. Further, the storage medium may be a component of the processor. The processor and the storage medium may be disposed in an ASIC. In addition, the ASIC may be disposed in the network device or the terminal device. Additionally, the processor and the storage medium may exist in the network device and the terminal device as discrete components.

All or some of the foregoing embodiments may be implemented by using software, hardware, firmware, or any combination thereof. When software is used for implementation, all or some of embodiments may be implemented in a form of a computer program product. The computer program product includes one or more computer programs or instructions. When the computer program or instruction is loaded and executed on a computer, the procedures or the functions described in embodiments are fully or partially performed. The computer may be a general-purpose computer, a dedicated computer, a computer network, or another programmable apparatus. The computer program or instruction may be stored in a non-transitory computer-readable storage medium, or may be transmitted by using the non-transitory computer-readable storage medium. The non-transitory computer-readable storage medium may be any usable medium accessible by a computer, or a data storage device, for example, a server integrating one or more usable media. The usable medium may be a magnetic medium, for example, a floppy disk, a hard disk, or a magnetic tape; may be an optical medium, for example, a DVD; or may be a semiconductor medium, for example, a solid-state drive (SSD), or the like.

In embodiments, unless otherwise specified or there is a logical conflict, terms and/or descriptions in different embodiments are consistent and may be mutual references. Features in different embodiments may be combined to form a new embodiment according to an internal logical relationship between the different embodiments.

It may be understood that various serial numbers in embodiments are merely for the purpose of distinction for ease of description, but are not intended to limit the scope of embodiments. Sequence numbers of the foregoing processes do not mean a sequence for performing. The sequence for performing the processes should be determined based on functions and internal logic of the processes.

An embodiment further provides a non-transitory computer-readable storage medium. The non-transitory computer-readable storage medium stores computer-executable instructions. When the computer-executable instructions are executed, the method performed by a terminal device or a network device in the foregoing method embodiment is implemented.

An embodiment further provides a computer program product. The computer program product includes a computer program. When the computer program is executed, the method performed by a terminal device or a network device in the foregoing method embodiment is implemented.

It should be noted that for ease of description, the foregoing method embodiments are represented as a series of action combinations. However, a person skilled in the art should know well that embodiments are not limited to the described sequence of the actions, because, according to embodiments, some steps may be performed in another sequence or simultaneously.

Cross reference may be made to the descriptions of embodiments herein, and the descriptions of embodiments have different focuses. For a part not described in detail in an embodiment, refer to related descriptions in another embodiment. For ease and brevity of description, for example, for functions and steps performed by an apparatus and a device provided in embodiments, refer to related descriptions of the method embodiments. The method embodiments and the apparatus embodiments may also be referenced, combined, or cited to each other.

Further, it should be noted that the foregoing embodiments are merely intended for describing the solutions of embodiments, not for limiting embodiments. Although embodiments are described in detail with reference to the foregoing embodiments, a person of ordinary skill in the art should understand that modifications may still be made to the solutions described in the foregoing embodiments or equivalent replacements may be made to some or all features thereof, without departing from the scope of the solutions of the embodiments.

What is claimed is:

1. A method, comprising:

receiving, by a terminal device, first indication information comprising a bitmap, wherein the first indication information is for determining a quantity of layers to be scheduled corresponding to each frequency domain unit in a plurality of frequency domain units, or is for determining a quantity of layers to be scheduled corresponding to each frequency domain unit group in one or more frequency domain unit groups, wherein one frequency domain unit group comprises one or more frequency domain units, one frequency domain unit comprises one or more frequency domain resources, and the one or more frequency domain resources in the frequency domain unit have a same quantity of layers to be scheduled; and determining, by the terminal device based on the bitmap of the first indication information, a quantity of layers to be scheduled that are on frequency domain resources used by the terminal device for data transmission, wherein at least two of the frequency domain resources for data transmission have different quantities of layers to be scheduled, wherein a first quantity of layers to be scheduled and a second quantity of layers to be scheduled are each determined based on bits in the bitmap.

2. The method according to claim 1, wherein the first indication information comprises a first bitmap, one bit in the first bitmap corresponds to one frequency domain unit, and the bit is for determining a quantity of layers to be scheduled that are in the frequency domain unit corresponding to the bit.

3. The method according to claim 2, wherein for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit comprises the frequency domain resource.

4. The method according to claim 1, wherein the first indication information comprises a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is for determining that a quantity of layers to be scheduled corresponding to the frequency domain unit group is a quantity of layers to be scheduled that are in a frequency domain unit of which a value of a bit is a first value in the frequency domain unit group.

5. The method according to claim 4, wherein for one frequency domain resource in the frequency domain resources for data transmission, when a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit, wherein the first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

6. The method according to claim 1, further comprising:

determining, by the terminal device based on the quantity of layers to be scheduled that are on the frequency domain resources for data transmission, a demodulation reference signal port in the frequency domain resources for data transmission, wherein demodulation reference signal ports in at least two of the frequency domain resources for data transmission are different.

7. The method according to claim 6, wherein for one frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

8. The method according to claim 6, further comprising:

receiving, by the terminal device, second indication information, wherein the second indication information comprises an index value that is in a demodulation reference signal port table and that corresponds to the frequency domain resources for data transmission;

wherein each index value in the demodulation reference signal port table corresponds to a plurality of quantities of demodulation reference signal ports; and for one frequency domain resource for data transmission, a demodulation reference signal port in the frequency domain resource is a first demodulation reference signal port, wherein a quantity of first demodulation reference signal ports corresponds to the index value, and the quantity of first demodulation reference signal ports is the same as a quantity of layers to be scheduled that are on the frequency domain resource.

9. The method according to claim 1, wherein before receiving, by the terminal device, the first indication information, the method further comprises:

determining, by the terminal device, third indication information, wherein the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups; and sending, by the terminal device, the third indication information to a network device.

10. An apparatus, comprising:

at least one processor;

at least one memory configured to store a computer program that, when executed by the at least one processor, causes the communication apparatus to:

receive first indication information comprising a bitmap, wherein the first indication information is for determining a quantity of layers to be scheduled corresponding to each frequency domain unit in a plurality of frequency domain units, or is for determining a quantity of layers to be scheduled corresponding to each frequency domain unit group in one or more frequency domain unit groups, wherein one frequency domain unit group comprises one or more frequency domain units, one frequency domain unit comprises one or more frequency domain resources, and the one or more frequency domain resources in the frequency domain unit have a same quantity of layers to be scheduled; and determine, based on the bitmap of the first indication information, a quantity of layers to be scheduled that are on frequency domain resources for data transmission, wherein at least two of the frequency domain resources for data transmission have different quantities of layers to be scheduled, wherein a first quantity of layers to be scheduled and a second quantity of layers to be scheduled are each determined based on bits in the bitmap.

11. The apparatus according to claim 10, wherein the first indication information comprises a first bitmap, one bit in the first bitmap corresponds to one frequency domain unit, and the bit is for determining a quantity of layers to be scheduled that are in the frequency domain unit corresponding to the bit.

12. The apparatus according to claim 11, wherein for one frequency domain resource in the frequency domain resources for data transmission, a quantity of layers to be scheduled that are on the frequency domain resource is a quantity of layers to be scheduled that is determined based on a bit corresponding to a first frequency domain unit; and the first frequency domain unit comprises the frequency domain resource.

13. The apparatus according to claim 10, wherein the first indication information comprises a second bitmap corresponding to each frequency domain unit group in the one or more frequency domain unit groups, one bit in the second bitmap corresponds to one frequency domain unit in a frequency domain unit group corresponding to the second bitmap, and each frequency domain unit group in the one or more frequency domain unit groups is in a one-to-one correspondence with the quantity of layers to be scheduled; and for one frequency domain unit group in the one or more frequency domain unit groups, the first indication information is for determining that a quantity of layers to be scheduled corresponding to the frequency domain unit group is a quantity of layers to be scheduled that are in a frequency domain unit of which a value of a bit is a first value in the frequency domain unit group.

14. The apparatus according to claim 13, wherein for one frequency domain resource in the frequency domain resources for data transmission, if a value of a bit of a frequency domain unit to which the frequency domain resource belongs in any one of the one or more frequency domain unit groups is the first value, a quantity of layers to be scheduled that are on the frequency domain resource is a quantity of layers to be scheduled that are in a first frequency domain unit, wherein the first frequency domain unit is a frequency domain unit of which a value of a bit is the first value in a frequency domain unit to which the frequency domain resource belongs in a first frequency domain unit group and a frequency domain unit to which the frequency domain resource belongs in a second frequency domain unit group; or the first frequency domain unit is a frequency domain unit to which the frequency domain resource belongs in a frequency domain unit group with a largest or smallest identifier in a first frequency domain unit group and a second frequency domain unit group; and the first frequency domain unit group and the second frequency domain unit group are any two of the one or more frequency domain unit groups.

15. The apparatus according to claim 10, wherein the computer program further causes the apparatus to:

determine, based on the quantity of layers to be scheduled that are on the frequency domain resources for data transmission, a demodulation reference signal port in the frequency domain resources for data transmission, wherein demodulation reference signal ports in at least two of the frequency domain resources for data transmission are different.

16. The apparatus according to claim 15, wherein for one frequency domain resource for data transmission, a demodulation reference signal port in the frequency domain resource is a first demodulation reference signal port, and a quantity of first demodulation reference signal ports is the same as a quantity of layers to be scheduled that are on the frequency domain resource.

17. The apparatus according to claim 15, wherein the computer program further causes the apparatus to:

receive second indication information, wherein the second indication information comprises an index value that is in a demodulation reference signal port table and that corresponds to the frequency domain resources for data transmission;

wherein each index value in the demodulation reference signal port table corresponds to a plurality of quantities of demodulation reference signal ports; and for one frequency domain resource for data transmission, a demodulation reference signal port in the frequency domain resource is a first demodulation reference signal port, wherein a quantity of first demodulation reference signal ports corresponds to the index value, and the quantity of first demodulation reference signal ports is the same as a quantity of layers to be scheduled that are on the frequency domain resource.

18. The apparatus according to a claim 10, wherein before the communication module receives the first indication information, and wherein the computer program further causes the apparatus to:

determine third indication information, wherein the third indication information indicates a correspondence between a frequency domain resource in a reporting band and each frequency domain unit in the plurality of frequency domain units, or the third indication information indicates a correspondence between a frequency domain resource in a reporting band and each frequency domain unit in the one or more frequency domain unit groups; and the communication module is further configured to send the third indication information to a network device.

19. A non-transitory computer-readable storage medium, wherein the storage medium stores a computer program or instructions; and when the computer program or the instructions is/are executed by a communication apparatus, cause the communication apparatus to:

receive first indication information comprising a bitmap, wherein the first indication information is for determining a quantity of layers to be scheduled corresponding to each frequency domain unit in a plurality of frequency domain units, or is for determining a quantity of layers to be scheduled corresponding to each frequency domain unit group in one or more frequency domain unit groups, wherein one frequency domain unit group comprises one or more frequency domain units, one frequency domain unit comprises one or more frequency domain resources, and the one or more frequency domain resources in the frequency domain unit have a same quantity of layers to be scheduled; and determine, based on the bitmap of the first indication information, a quantity of layers to be scheduled that are on frequency domain resources for data transmission, wherein at least two of the frequency domain resources for data transmission have different quantities of layers to be scheduled, wherein a first quantity of layers to be scheduled and a second quantity of layers to be scheduled are each determined based on bits in the bitmap.

20. A communication chip comprising at least one processor, wherein the at least one processor is coupled with at least one memory that stores computer instructions, that when executed by the at least one processor, cause the communications chip to:

receive first indication information comprising a bitmap, wherein the first indication information is for determining a quantity of layers to be scheduled corresponding to each frequency domain unit in a plurality of frequency domain units, or is for determining a quantity of layers to be scheduled corresponding to each frequency domain unit group in one or more frequency domain unit groups, wherein one frequency domain unit group comprises one or more frequency domain units, one frequency domain unit comprises one or more frequency domain resources, and the one or more frequency domain resources in the frequency domain unit have a same quantity of layers to be scheduled; and determine, based on the bitmap of the first indication information, a quantity of layers to be scheduled that are on frequency domain resources for data transmission, wherein at least two of the frequency domain resources for data transmission have different quantities of layers to be scheduled, wherein a first quantity of layers to be scheduled and a second quantity of layers to be scheduled are each determined based on bits in the bitmap.

\* \* \* \* \*